United States Patent
Yang et al.

(10) Patent No.: US 8,111,359 B2
(45) Date of Patent: Feb. 7, 2012

(54) ARRAY SUBSTRATE, METHOD OF MANUFACTURING THE SAME AND LIQUID CRYSTAL DISPLAY APPARATUS HAVING THE SAME

(75) Inventors: Yong-Ho Yang, Seoul (KR); Kyo-Seop Choo, Suwon-si (KR); Ji-Hye Moon, Seoul (KR); Jin-Suk Park, Seoul (KR)

(73) Assignee: Samsung Electronics Co., Ltd. (KR)

(*) Notice: Subject to any disclaimer, the term of this patent is extended or adjusted under 35 U.S.C. 154(b) by 423 days.

(21) Appl. No.: 12/393,393

(22) Filed: Feb. 26, 2009

(65) Prior Publication Data
US 2009/0162958 A1 Jun. 25, 2009

Related U.S. Application Data

(60) Continuation of application No. 10/840,107, filed on May 6, 2004, now Pat. No. 7,209,199, and a division of application No. 11/693,920, filed on Mar. 30, 2007, now Pat. No. 7,515,230.

(30) Foreign Application Priority Data

Nov. 28, 2003 (KR) .................... 20-2003-0037231 U

(51) Int. Cl.
*G02F 1/1335* (2006.01)
(52) U.S. Cl. ...................................................... 349/114
(58) Field of Classification Search .................... 349/114
See application file for complete search history.

(56) References Cited

U.S. PATENT DOCUMENTS

| 6,281,952 | B1 | 8/2001 | Okamoto et al. |
| 6,862,059 | B2 | 3/2005 | Murai et al. |
| 6,956,632 | B2 | 10/2005 | Ozawa et al. |
| 7,209,199 | B2 | 4/2007 | Yang et al. |
| 7,298,430 | B2 | 11/2007 | Nishino et al. |
| 7,466,380 | B2 * | 12/2008 | Tsuchiya et al. .............. 349/114 |
| 2004/0165130 | A1 | 8/2004 | Ozawa et al. |
| 2004/0252263 | A1 | 12/2004 | Yang et al. |
| 2005/0036086 | A1 | 2/2005 | Kim et al. |
| 2005/0151901 | A1 | 7/2005 | Kikkawa et al. |
| 2005/0200778 | A1 | 9/2005 | Kim et al. |
| 2006/0262240 | A1 | 11/2006 | Anno et al. |

FOREIGN PATENT DOCUMENTS

| JP | 2003-270628 A | 9/2003 |
| JP | 2004-085918 A | 3/2004 |
| JP | 2004-354745 A | 12/2004 |
| KR | 10-2003-0034855 A | 5/2003 |

* cited by examiner

*Primary Examiner* — James Dudek
(74) *Attorney, Agent, or Firm* — Cantor Colburn LLP

(57) ABSTRACT

An array substrate includes a transparent substrate, an organic insulation layer, a pixel electrode, a reflective layer, a light blocking pattern and a switching part. The transparent substrate includes a reflective window that reflects an ambient light and a transmissive window that transmits an artificial light. The organic insulation layer disposed over the transparent substrate becomes thinner gradually at a boundary between the transmissive window and the reflective window. The pixel electrode is formed in the transmissive region. The reflective layer is disposed over the organic insulation layer of the reflective window. The light blocking pattern is disposed at the boundary between the transmissive and reflective windows to prevent a light leakage. The switching part is electrically connected to the pixel electrode to apply an image signal to the pixel electrode. Therefore, a light leakage occurring at boundary is prevented by the light blocking pattern.

11 Claims, 23 Drawing Sheets

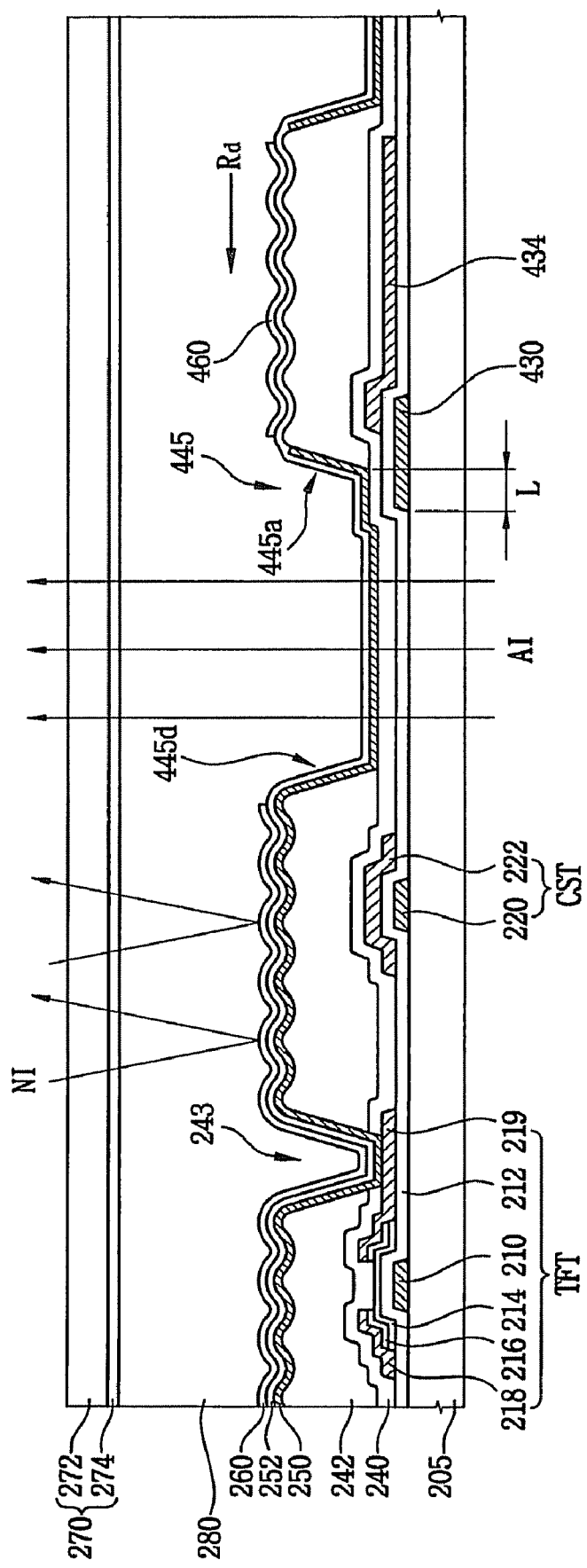

ARRAY SUBSTRATE, METHOD OF MANUFACTURING THE SAME AND LIQUID CRYSTAL DISPLAY APPARATUS HAVING THE SAME

CROSS-REFERENCE TO RELATED APPLICATIONS

This application is a divisional of U.S. application Ser. No. 11/693,920 filed Mar. 30, 2007, which is a continuation of U.S. application Ser. No. 10/840,107 filed May 6, 2004 and issued as U.S. Pat. No. 7,209,199 on Apr. 24, 2007, which claims priority to and the benefit of Korean Patent Application No. 2003-37231 filed on Jun. 10, 2003, the contents of which are herein incorporated by reference in their entirety.

BACKGROUND OF THE INVENTION

1. Field of the Invention

The present invention relates to an array substrate, a method of manufacturing the array substrate and a liquid crystal display apparatus having the array substrate. More particularly, the present invention relates to a transmissive and reflective type array substrate for preventing light leakages, a method of manufacturing the array substrate and a liquid crystal display apparatus having the array substrate.

2. Description of the Related Art

Generally, a photosensitive material for patterning an oxidation layer, a metal layer, a semiconductor layer, etc. is widely used in a process of manufacturing a semiconductor device or a liquid crystal display apparatus.

The liquid crystal display apparatus includes an array substrate having a plurality of thin film transistors, a color filter substrate having a plurality of color filters, and a liquid crystal layer interposed between the array substrate and the color filter substrate.

The liquid crystal display apparatus may be classified into a transmissive type liquid crystals display apparatus that displays images by using an artificial light, a reflective type liquid crystal display apparatus that displays images by using an ambient light, and a transmissive and reflective type liquid crystal display apparatus that has merits of the transmissive type liquid crystal display apparatus and the reflective type liquid crystal display apparatus.

FIG. 1 is a schematic cross-sectional view showing a conventional array substrate for a transmissive and reflective type liquid crystal display apparatus.

Referring to FIG. 1, a conventional array substrate for a transmissive and reflective type liquid crystal display apparatus includes a transparent substrate 10, a data line 20, an organic insulation layer 30, a pixel electrode 40 and a reflective layer 50. An image signal is transferred via the data line 20. The organic insulation layer 30 is formed on the transparent substrate 10, such that the organic insulation layer 30 defines a reflective region R and a transmissive region T. The pixel electrode 40 is formed on the organic insulation layer 30, and the pixel electrode 40 receives the image signal. The reflective layer 50 is formed on the pixel electrode 40 or on the organic insulation layer 30 to reflect an ambient light.

The organic insulation layer 30 is formed in the reflective region R, but not formed in the transmissive region T. Therefore, a light Al generated from a backlight passes through the transmissive region T, and an ambient light Nl is reflected on the reflective layer 50. Liquid crystal molecules are disposed over the pixel electrode 40 and the reflective layer 50.

Characteristics of displayed images depend on an arrangement of the liquid crystal molecules, and response of the liquid crystal molecules are changed in accordance with electric fields that are applied to the liquid crystal molecules. Therefore, a process of manufacturing the liquid crystal display apparatus includes an alignment process for uniform alignment of liquid crystal molecules.

The alignment process includes a coating process for coating an alignment film, and a rubbing process for aligning the liquid crystal molecules according to a pretilt angle. When the rubbing process is not uniform throughout the alignment film, the alignment of the liquid crystal molecules is irregular to induce a locally irregular arrangement of the liquid crystal molecules. In case of the transmissive and reflective type liquid crystal display apparatus, above described problems become more serious.

As shown in FIG. 1, liquid crystal molecules are arranged in accordance with a rubbing direction Rd, such that the liquid crystal molecules form a pretilt angle. However, even when rubbing grooves are uniformly formed via the rubbing process, the pretilt angle of first and second inclined portions (or boundary regions) 'A' and 'B' is not uniform. That is, liquid crystal molecules of the reflective region R and the transmissive region T maintain a uniform pretilt angle, but pretilt angle of liquid crystal molecules disposed in the first and second inclined portions 'A' and 'B' is not identical with the uniform pretilt angle due to an inclination. As a result, a light generated from a backlight assembly leaks through the first and second inclined portions 'A' and 'B' to induce an inferiority of a display quality.

FIG. 2 is a schematic plan view of the conventional transmissive and reflective type liquid crystal display apparatus showing a light leakage caused by an abnormal pretilt angle. In FIG. 2, rectangular shape that is not hatched represents the transmissive region 'T' of FIG. 1, and 'CNT' represents a contact hole through which drain electrode of a switching device and a pixel electrode are electrically connected to each other.

As explained above, a light leaks through a boundary region 'E' of the transmissive region 'T' and the reflective region 'R'. Especially, the light leaks much at the boundary region 'E' between the reflective region and the transmissive region arranged in that sequence along a rubbing direction Rd.

Furthermore, when the transmissive and reflective type liquid crystal display panel is used as a touch screen panel, a display defect caused by moisture may occur as well as the light leakage. When the touch screen panel is compressed, electric fields of the boundary region becomes unstable to induce an abnormal arrangement of the liquid crystal molecules. Therefore, a fatal light leakage occurs, so that an afterimage remains at the boundary region and moisture gathers at the surface of the touch screen panel.

As described above, the light leakage caused by an abnormal arrangement of liquid crystal molecules disposed in a boundary region between a reflective region and a transmissive region comes out as problems.

BRIEF SUMMARY OF THE INVENTION

The present invention provides an array substrate for preventing a light leakage that occurs at a boundary region between a transmissive region and a reflective region.

The present invention also provides a method of manufacturing the array substrate.

The present invention also further provides a liquid crystal display apparatus having the array substrate.

In an exemplary array substrate according to the invention, the array substrate includes a transparent substrate, an organic insulation layer, a pixel electrode, a reflective layer, a light blocking pattern and a switching part. The transparent substrate includes a reflective window that reflects an ambient light and a transmissive window that transmits an artificial light. The organic insulation layer is disposed over the transparent substrate. The organic insulation layer becomes thinner gradually at a boundary between the transmissive window and the reflective window. The pixel electrode is formed in the transmissive region. The reflective layer is disposed over the organic insulation layer of the reflective window. The light blocking pattern is disposed at the boundary between the transmissive window and the reflective window to prevent a light leakage. The switching part is electrically connected to a gate line, a source line and the pixel electrode to apply an image signal to the pixel electrode.

In an exemplary method of forming an array substrate, a first thin film is formed on a transparent substrate. The first thin film is patterned to form a gate line, a gate electrode protruded from the gate line and a light blocking pattern. A gate insulation layer and a semiconductor layer are formed on the transparent substrate having the light blocking pattern. A second thin film is formed on the semiconductor layer. The second thin film is patterned to form a source line, a source electrode protruded from the source line and a drain electrode that is spaced apart from the source electrode. The gate, source and drain electrodes forms a switching device. An organic insulation layer is coated on the transparent substrate having the switching device formed thereon, and a portion of the organic insulation layer is removed to form a contact hole through which the drain electrode is exposed, and a transmissive window such that a side portion of the transmissive window overlaps with the light blocking pattern. A pixel electrode that is electrically connected to the drain electrode via the contact hole is formed over the organic insulation layer. Then, a reflective layer is formed over the organic insulation layer to form a reflective window.

In an exemplary liquid crystal display apparatus according to the invention, the liquid crystal display apparatus includes an upper substrate, a lower substrate and a liquid crystal layer. The upper substrate has a color filter. The lower substrate faces the upper substrate, and the lower substrate includes a pixel portion, an organic insulation layer and a light blocking pattern. The pixel portion has a reflective window that reflects an ambient light and a transmissive window that transmits an artificial light. The organic insulation layer has an inclined portion that is disposed at a boundary of the reflective window and the transmissive window. The light blocking pattern is disposed at the boundary to intercept a portion of the artificial light that leaks from the boundary. The liquid crystal layer is interposed between the upper substrate and the lower substrate.

According to the present invention, a light leakage at the boundary of the reflective window and the transmissive window is prevented to improve a display quality.

BRIEF DESCRIPTION OF THE DRAWINGS

The above and other features and advantage points of the present invention will become more apparent by describing in detailed exemplary embodiments thereof with reference to the accompanying drawings, in which:

FIG. 11 is a cross-sectional view taken along a line C-C' of FIG. 10;

DETAILED DESCRIPTION OF THE INVENTION

Hereinafter the preferred embodiments of the present invention will be described in detail with reference to the accompanied drawings.

Figure 1:
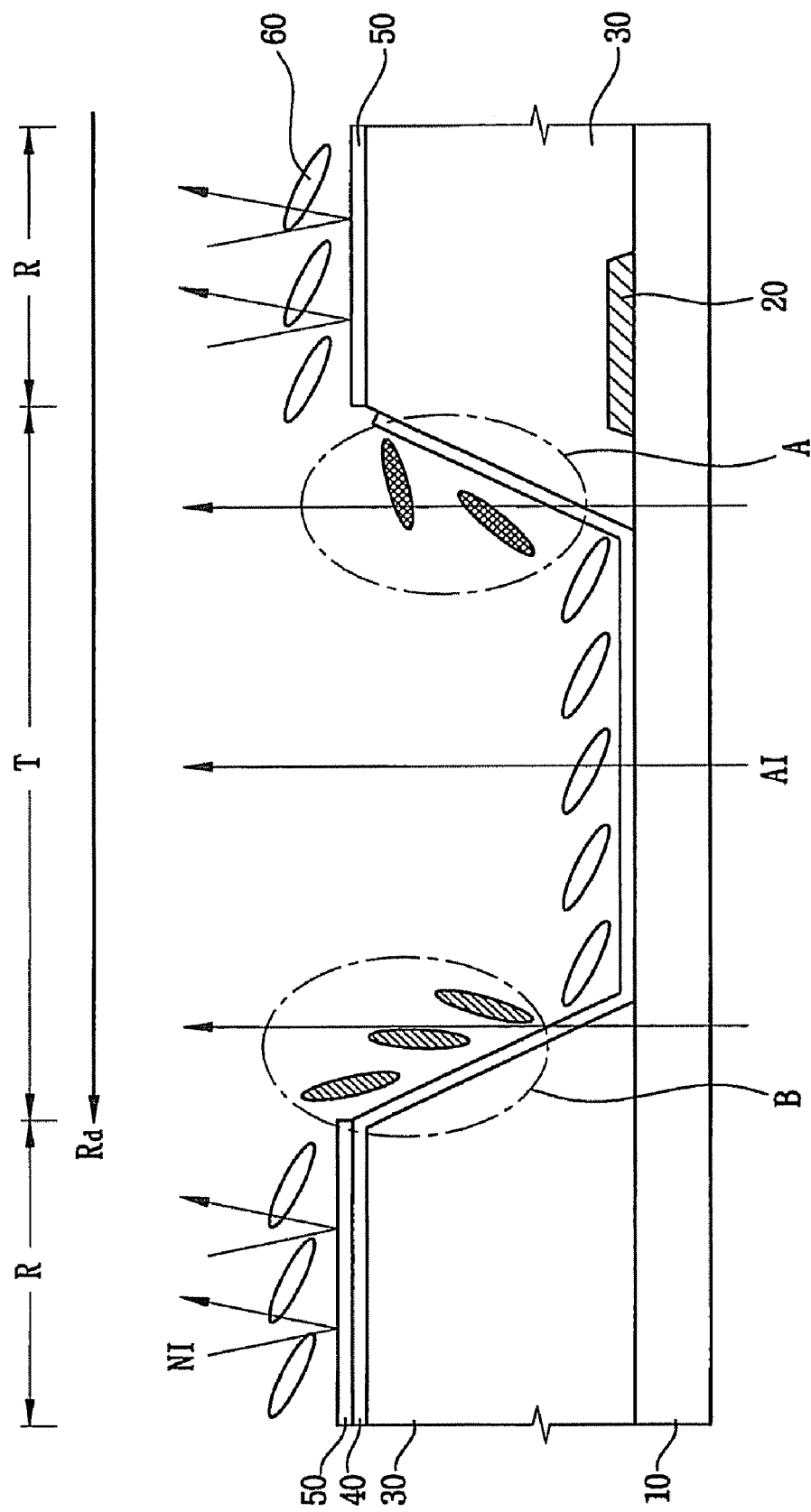
FIG. 1 is a schematic cross-sectional view showing a conventional array substrate for a transmissive and reflective type liquid crystal display apparatus.
Figure 2:
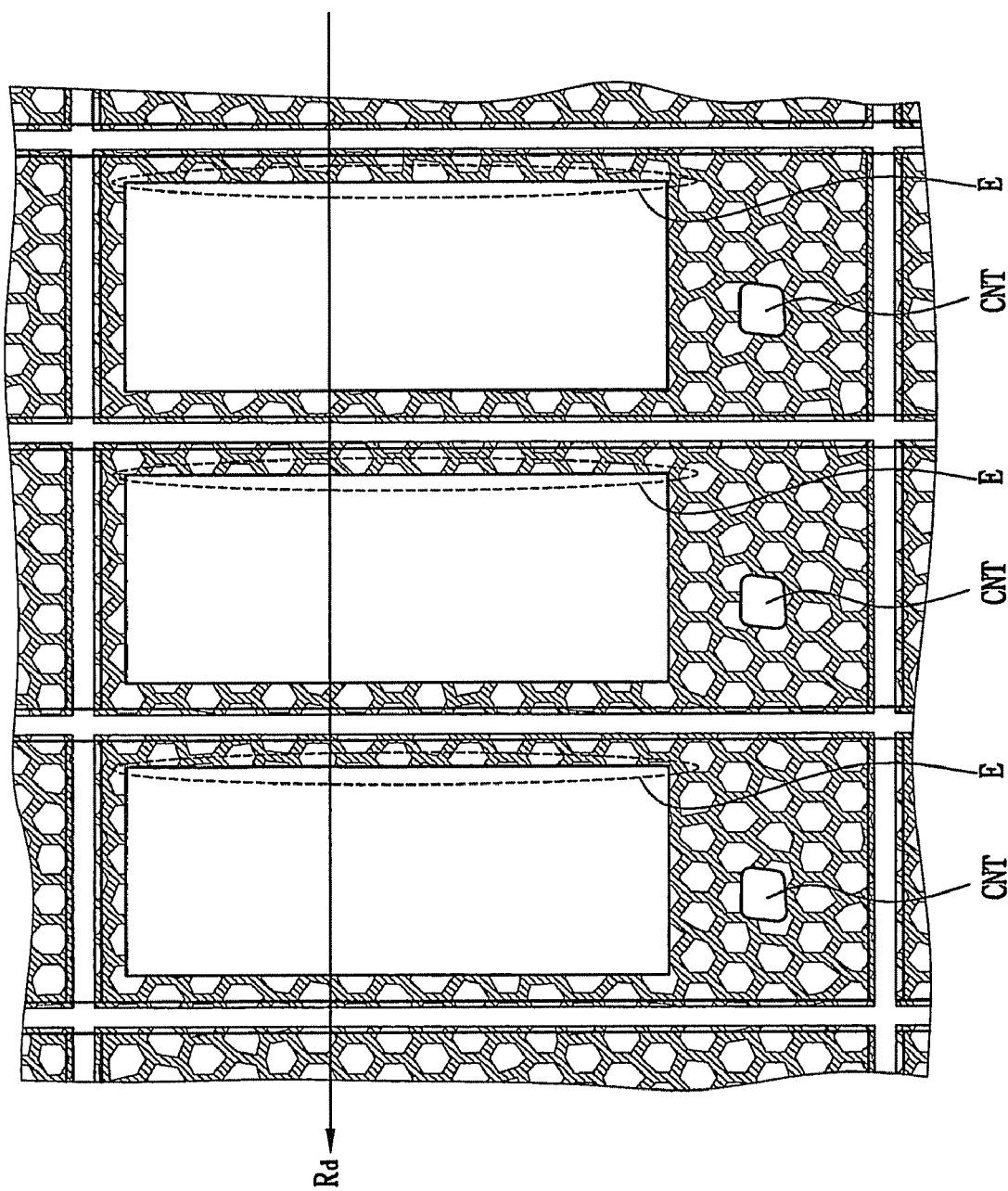
FIG. 2 is a schematic plan view of the conventional transmissive and reflective type liquid crystal display apparatus showing a light leakage caused by an abnormal pretilt angle.
Figure 3:
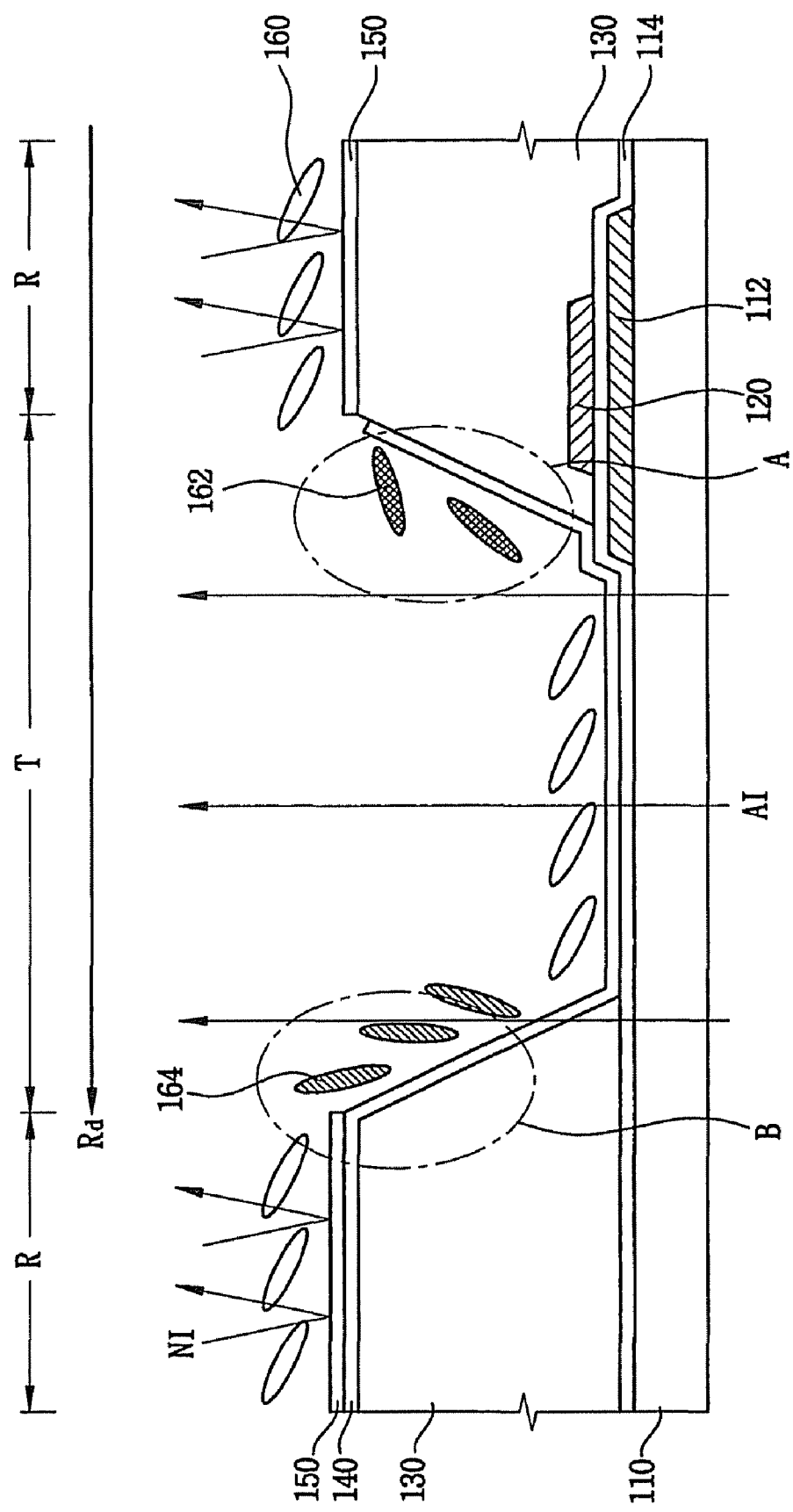
FIG. 3 is a schematic cross-sectional view showing an array substrate of a transmissive and reflective type liquid crystal display apparatus according to an exemplary embodiment of the present invention.

FIG. 3 is a schematic cross-sectional view showing an array substrate of a transmissive and reflective type liquid crystal display apparatus according to an exemplary embodiment of the present invention.

Referring to FIG. 3, an array substrate of a transmissive and reflective type liquid crystal display apparatus according to an exemplary embodiment of the present invention includes a transparent substrate 110 having a pixel portion and a switching portion, a data wiring 120 for transferring a pixel signal to the switching portion (not shown), an organic insulation layer 130 for defining a reflective region 'R' and a transmissive region 'T', a pixel electrode 140 receiving the pixel signal from the switching portion, and a reflective layer 150 formed on the pixel electrode 140 and the organic insulation layer 130.

The pixel portion is a minimum unit for displaying an image, and the pixel portion includes the reflective region 'R' where an ambient light Nl is reflected and the transmissive region 'T' where a light generated from a backlight assembly is transmitted. The switching device controls the pixel signal that is to be applied to the pixel electrode. A light blocking pattern 112 is formed on the transparent substrate 110. An insulation layer 114 is formed on the transparent substrate 110 having the light blocking pattern 112 formed thereon, such that the insulation layer 114 covers the transparent 110 and the light blocking pattern 112.

The organic insulation layer 130 has a column shape having a predetermined width and height. A portion of the organic insulation layer 130 is removed to form a transmissive window corresponding to the transmissive region 'T'. The pixel electrode 150 is formed on the organic insulation layer 130, and the reflective electrode 150 is formed on the pixel electrode 150 of the reflective region 'R'. The organic insulation layer of first and second boundary regions 'A' and 'B' are inclined. The first boundary region 'A' corresponds to a region disposed between the reflective region 'R' and the transmissive region 'T' arranged in that sequence along a rubbing direction Rd, and the second boundary region 'B' corresponds to a region disposed between the transmissive region 'T' and the reflective region 'R' arranged in that sequence along the rubbing direction Rd. When a rubbing process is completed, liquid crystal molecules 160 are arranged toward the rubbing direction forming a pretilt angle with respect to the pixel electrode 140 and the reflective layer 150. Therefore, liquid crystal molecules of the first boundary region 'A' lie with respect to the transparent substrate 110, and the liquid crystal molecules of the second boundary region 'B' erect with respect to the transparent substrate 110.

The pixel electrode 140 is transparent, so that the light Al generated from the backlight assembly may pass through the pixel electrode 140 to advance toward upper substrate (not shown). The ambient light Nl arrives at the reflective layer 150 from the upper substrate, and reflected on the reflective layer 150 to advance toward the upper substrate.

For example, the light blocking pattern 112 covers an orthogonal projection of the first boundary region 'A'. The light blocking pattern 112 may be extended toward the transmissive region 'T', such that the light blocking pattern 112 invades the transmissive region 'T'. Therefore, the light generated from the backlight assembly that is to pass through the first boundary region 'A' is blocked by the light blocking pattern 112 to prevent a light leakage.

The light blocking pattern 112 may be formed to cover an orthogonal projection of the second boundary region 'B'. Therefore, a light leakage occurring at the second boundary region 'B' is prevented. When the rubbing direction is reversed, the pretilt angle is changed in accordance with the rubbing direction. In FIG. 3, the organic insulation layer 130 is not formed in the transmissive region 'T'. However, the organic insulation layer 130 may be formed in the transmissive region 'T' to have a thickness that is thinner than the organic insulation layer 130 of the reflective region 'R'. In FIG. 3, the first and second boundary regions 'A' and 'B' is not vertical. However, even when the first and second boundary regions 'A' and 'B' are vertical, a light leakage occurs. Therefore, the light blocking layer 130 may be formed in the first and second boundary regions 'A' and 'B'.

Figure 4:
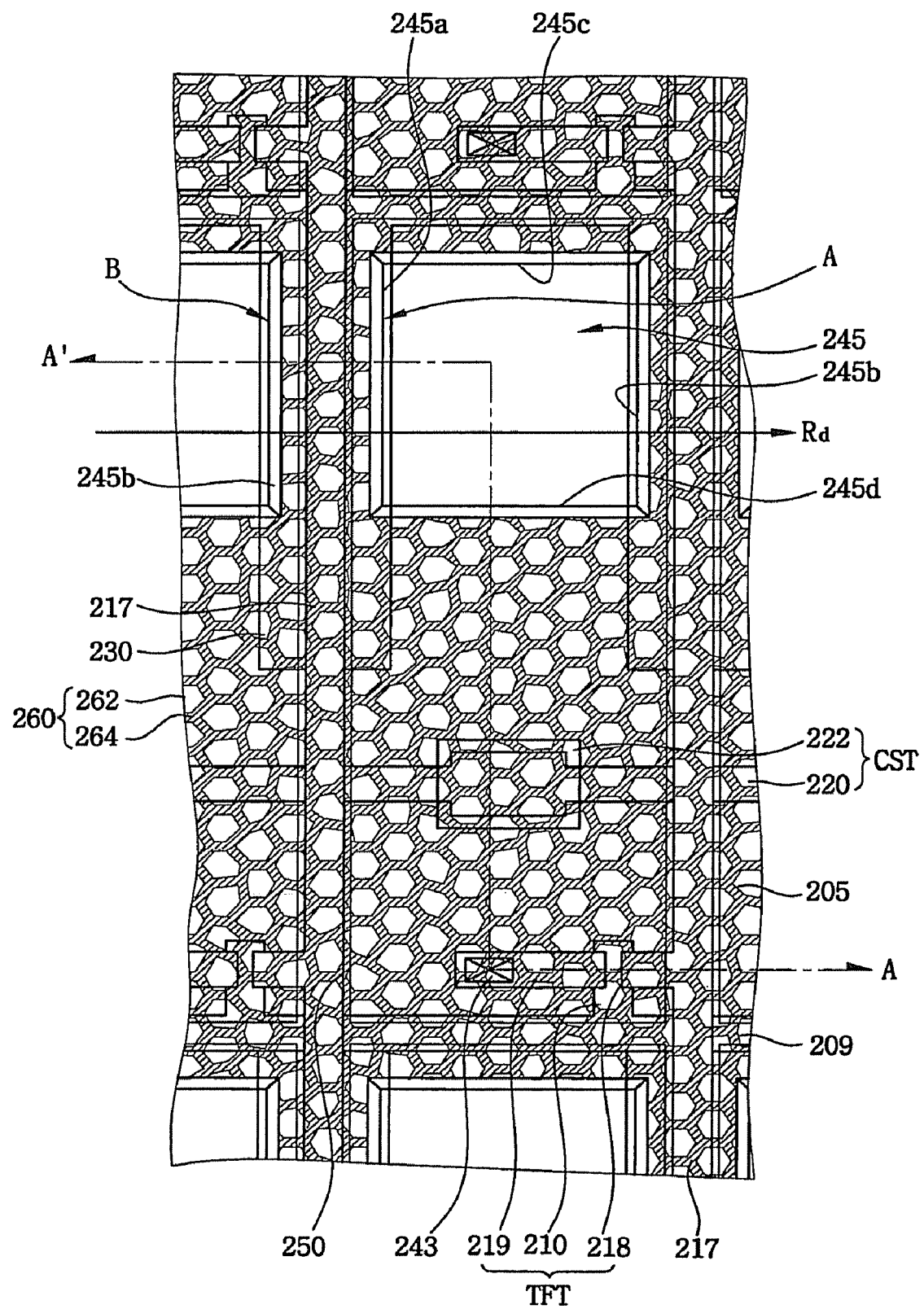
FIG. 4 is a plan view showing a transmissive and reflective type liquid crystal display apparatus according to a first exemplary embodiment of the present invention.

FIG. 4 is a plan view showing a transmissive and reflective type liquid crystal display apparatus according to a first exemplary embodiment of the present invention.

Referring to FIG. 4, a liquid crystal display apparatus according to a first exemplary embodiment of the present invention includes a plurality of gate lines 209, a plurality of source lines 217, a thin film transistor TFT as switching device, a storage capacitor CST, a light blocking pattern 230, a pixel electrode 250, a reflective layer 260 formed in a reflective region. The reflective layer 260 defines reflective and transmissive regions.

The gate lines 209 are formed on a transparent substrate. The gate lines 209 are extended in a horizontal direction, and the gate lines 209 are arranged in a vertical direction. The source lines 217 are extended in the vertical direction, and the gate lines 209 are arranged in the horizontal direction. Therefore, neighboring gate lines 209 and neighboring source lines 217 define a pixel region. The pixel region includes a thin film transistor TFT and a storage capacitor CST. The pixel region includes a transmissive region 245 and a reflective region. A light generated from a backlight assembly (not shown) passes through the transmissive region 245, and an ambient light is reflected on the reflective region. For example, the transmissive region 245 has a rectangular shape, and arranged in parallel with the source lines 217. The transmissive region 245 has a first side portion 245a, a second side portion 245b facing the first side portion 245a, a third side portion 245c and a fourth side portion 245d facing the third side portion 245c. The first and second side portions 245a and 245b are disposed at first and second boundaries 'A' and 'B', respectively. The first boundary 'A' corresponds to a region between the reflective region and the transmissive region 245 in that sequence along the rubbing direction Rd. The second boundary 'B' corresponds to a region between the transmissive region 245 and the reflective region in that sequence along the rubbing direction Rd. The third and fourth side portions 245c and 245d are substantially parallel with the gate lines 209. The thin film transistor TFT includes a gate electrode line 210 protruded from the gate lines 209, a source electrode line 218 protruded from the source lines 217, and a drain electrode line 219 that is spaced apart from the source electrode line 218.

The storage capacitor CST is defined by a first storage electrode line 220 and a second storage electrode line 222 that is formed via a process of forming the source electrode lines 217.

The light blocking pattern 230 is formed via a process of forming the gate lines 209, such that a length of the light blocking pattern 230 is larger than a length of the first side portion 245a of the transmissive region 245, and a width of the light blocking pattern 230 is wider than a width of the source lines 217.

The pixel electrode 250 comprises an optically transparent and electrically conductive material, for example, such as indium tin oxide (ITO), indium zinc oxide (IZO), etc. The pixel electrode 250 is formed in the pixel region that is defined by the neighboring gate lines and neighboring source lines. The pixel electrode 250 is electrically connected to the drain electrode line 219 via the contact hole 243, so that a pixel voltage is applied to the pixel electrode 250 via the drain electrode line 219.

The reflective layer 260 is formed on the pixel electrode 250 to form a reflective region (or reflective window). A portion of the reflective layer 260 is removed to form the transmissive region (or transmissive window) 245 through which a light generated from a backlight assembly passes. A portion of the light blocking pattern 230 is exposed via the transmissive region 245. That is, the portion of the light blocking pattern 230 invades the first side portion 245a of the transmissive region 245 to prevent a light leakage of the first side portion 245a of the transmissive region 245.

For example, when the rubbing direction Rd is from a left side to a right side, as shown in FIG. 4, a first amount of light leaks through the first side portion 245a of the transmissive region 245, and a second amount of light leaks through the second side portion 245b in case of a conventional array substrate. The first amount of light is more than the second amount of light. However, when the light blocking layer is formed, a light leakage is prevented. The light blocking layer may be formed at both of the first and second side portions 245a and 245b to prevent the light leakages that occur at the first and second side portions 245a and 245b. The light blocking layer may be formed only at the first side portion 245a in order to increase an aperture ratio.

For example, when the rubbing direction is from lower side to upper side of FIG. 4, the light blocking pattern may be formed at the fourth side portion 245d of the transmissive region. Further, when the rubbing direction is from the upper side to lower side of FIG. 4, the gate lines 209 is broaden to the third side portion 245c to form the light blocking layer.

Further, when the rubbing direction corresponds to one or two o'clock direction, a light blocking pattern may be formed at the first and fourth side portions 245a and 245d. When the rubbing direction corresponds to 10 or 11 o'clock direction, a light blocking pattern may be formed at the second and third side portions 245b and 245c.

In the present embodiment, an array substrate having a top ITO structure, in which the pixel electrodes comprising indium tin oxide (ITO) is formed on the organic insulation layer, is employed in order to explain the present embodiment. However, the present embodiment may be applied to a bottom ITO structure, in which the pixel electrodes is formed under the organic insulation layer.

Further, the reflective layer is formed on the pixel electrode in the present embodiment. However, the pixel electrode may be formed on the reflective layer.

Figure 5:
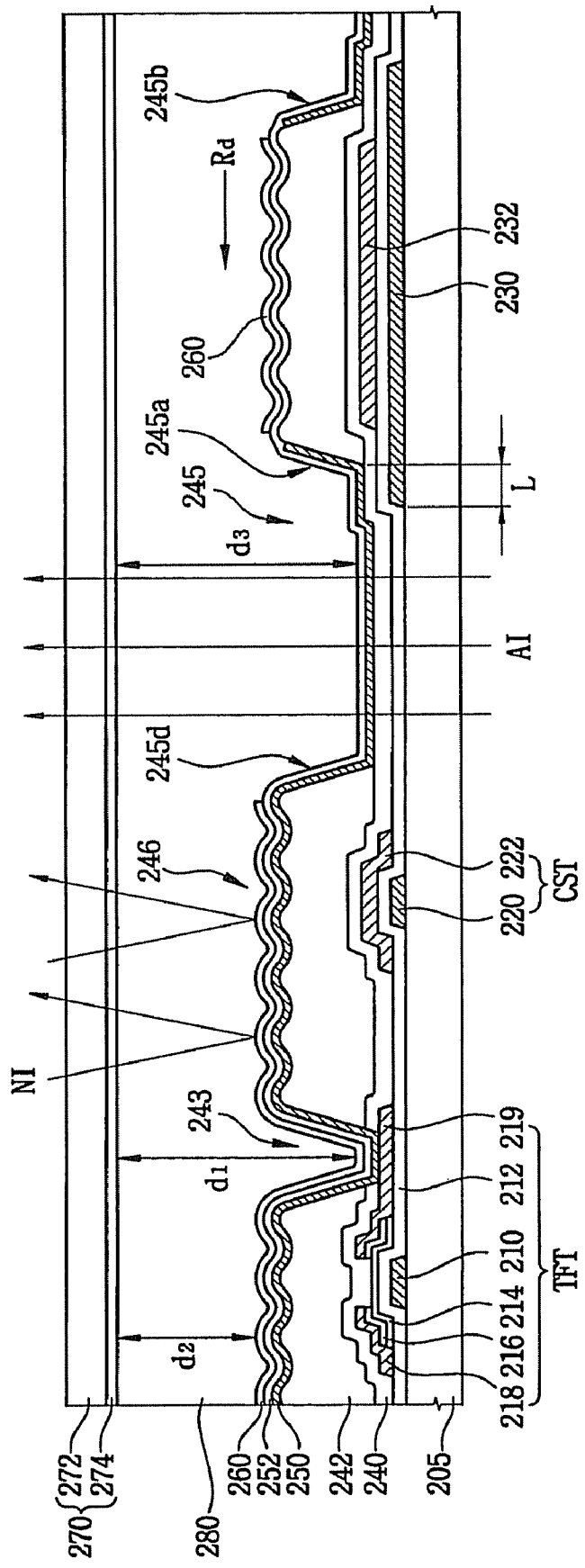
FIG. 5 is a cross-sectional view taken along a line A-A' of FIG. 4.

FIG. 5 is a cross-sectional view taken along a line A-A' of FIG. 4. A light blocking pattern is extended from the gate line to overlap with both first and second side portions 245a and 245b.

Referring to FIG. 5, a transmissive and reflective type liquid crystal display apparatus according to a first exemplary embodiment of the present invention includes an array substrate, a color filter substrate 270 and a liquid crystal layer 280 interposed between the array substrate and the color filter substrate 270.

The array substrate includes a thin film transistor TFT, a storage capacitor CST and an organic insulation layer 242. The thin film transistor TFT includes a gate electrode 210, a semiconductor layer 214, an ohmic contact layer 216, a source electrode 218 and a drain electrode 219. The gate electrode 210 is extended from a gate line 209 formed on a transparent substrate 205. A gate insulation layer 212 is formed on the gate electrode 210 and the transparent substrate 205.

The storage capacitor CST includes a first storage electrode line 220 and a second storage electrode line 222. The first storage electrode line 220 is formed on the transparent substrate 205, such that the first storage electrode line 220 is spaced apart from the thin film transistor TFT. The second storage electrode line 222 is formed over the first storage electrode line 220.

The organic insulation layer 242 is covers the thin film transistor TFT and the storage capacitor CST. A portion of the organic insulation layer 242 is removed to expose a portion of the drain electrode 219. A plurality of grooves or recesses may be formed on an upper surface of the organic insulation layer 242.

Additionally, the array substrate includes a light blocking pattern 230 and a source line 217. The light blocking pattern 230 is extended from the gate line 209. The source line 217 is formed over the light blocking pattern 230. A length of the light blocking pattern 230 is larger than a length of the first side portion 245a of a transmissive window, and a width of the light blocking pattern 230 is larger than a width of the source line 217.

The array substrate also includes a pixel electrode 250, an insulation layer 252 and a reflective layer 260. The pixel electrode 250 is electrically connected to the drain electrode 219 via a contact hole 243. The insulation layer 252 covers the thin film transistor TFT. The reflective layer 260 is formed on the insulation layer 252, and the reflective layer 260 reflects a light. Therefore, a region, where the organic insulation layer 242 and the reflective layer 260 are formed, corresponds to a reflective region (or reflective window) 246, and a region, where the organic insulation layer 242 is not formed, corresponds to a transmissive region (or transmissive window) 245. Therefore, the transmissive region 245 includes only the pixel electrode 250 and the insulation layer 252, not the reflective layer 260. A width of the light blocking pattern 230 is larger than a width of the source line 217. Therefore, the light blocking pattern 230 overlaps with the first and second side portions 245a and 245b of neighboring transmissive windows, by a length 'L', respectively. That is, the light blocking pattern 230 overlaps with first and second regions 'A' and 'B' of FIG. 4 to prevent a light leakage that occurs at the first and second regions 'A' and 'B'.

The pixel electrode 250 comprises an optically transparent and electrically conductive material, for example, such as indium tin oxide (ITO), tin oxide (TO), indium zinc oxide (IZO), etc.

In the present embodiment, the insulation layer 252 is interposed between the pixel electrode 250 and the reflective layer 260 to electrically insulate the pixel electrode 250 from the reflective layer 260. However, the reflective layer 260 may be formed on the pixel electrode 250.

The color filter substrate 270 includes a black matrix (not shown), a color filter layer 274 having R, G, B color filters and a protection layer (not shown). The black matrix defines R, G, B pixel regions. The R, G, B color filters of the color filter layer 274 are formed in the R, G, B pixel regions, respectively. The protection layer protects the black matrix and the color filter layer 274. The R, G, B color filters may overlap to form the black matrix instead of forming separate black matrix. A common electrode (not shown) may be formed on the protection layer.

The liquid crystal layer 280 transmits an ambient light or a light that has passed through the transmissive window in accordance with a pixel voltage applied to the pixel electrode 250 and a reference voltage applied to the common electrode.

The liquid crystal layer 280 includes a first liquid crystal layer, a second liquid crystal layer and a third liquid crystal layer. The first liquid crystal layer corresponds to a liquid crystal layer 280 of the contact hole 243 region, and the first liquid crystal layer has a first cell gap d1. The second liquid crystal layer corresponds to a liquid crystal layer 280 disposed over the organic insulation layer 242, and the second liquid crystal layer has a second cell gap d2. The third liquid crystal layer corresponds to a liquid crystal layer 280 of the transmissive window 245, and the third liquid crystal layer has a third cell gap d3. For example, the second cell gap d2 is no larger than the first cell gap d1, and the first cell gap d1 is no larger than the third cell gap d3 (d2≦d1≦d3).

Therefore, when Δn represents a refractivity anisotropy, and 'd' represents a cell gap, the first liquid crystal layer is characterized by Δnd1, the second liquid crystal layer is characterized by Δnd2, and the third liquid crystal layer is characterized by Δnd3.

Optimal cell gap depends on an optical films disposed under or over the liquid crystal layer 280. However, generally, the second cell gap d2 is less than 1.7 μm, and the third cell gap d3 is less than 3.3 μm.

For example, a twist angle of the liquid crystal layer is about 0°. Thus, a rubbing direction of the array substrate is opposite to a rubbing direction of the color filter substrate. That is, when a rubbing direction of the array substrate turns toward right side as shown in FIG. 4, a gate line is diverged to form the light blocking pattern 230, such that the light blocking pattern 230 overlaps with the first side portion 245a of the transmissive window 245 through which light leaks much.

When the rubbing direction of the array substrate turns toward left side, a gate line is diverged to form the light blocking pattern 230, such that the light blocking pattern 230 overlaps with the second side portion 245b of the transmissive window 245.

When the rubbing direction of the array substrate turns toward upper side, the light blocking pattern overlaps with the third side portion 245c. When the rubbing direction of the array substrate turns toward lower side, the light blocking pattern overlaps with the fourth side portion 245d. In order to form the light blocking pattern, the gate line may be diverged. However, a width of the gate line may be increased to the fourth side portion 245d to form the light blocking pattern. When the rubbing direction corresponds to two or three o'clock direction, or ten or eleven o'clock direction, the gate line may be diverged to be overlapped with the first and fourth side portions 245a and 245d or second and third side portions 245b and 245c.

Hereinbefore, the pixel electrode 250 is formed on the array substrate and the common electrode is formed on the color filter substrate. However, the common electrode may be omitted by applying different voltage to the array substrate to transmit an ambient light or a light generated from a backlight assembly.

FIGS. 6A to 6D are layouts showing a process of manufacturing the transmissive and reflective type liquid crystal display apparatus of FIG. 4.

Figure 6A:
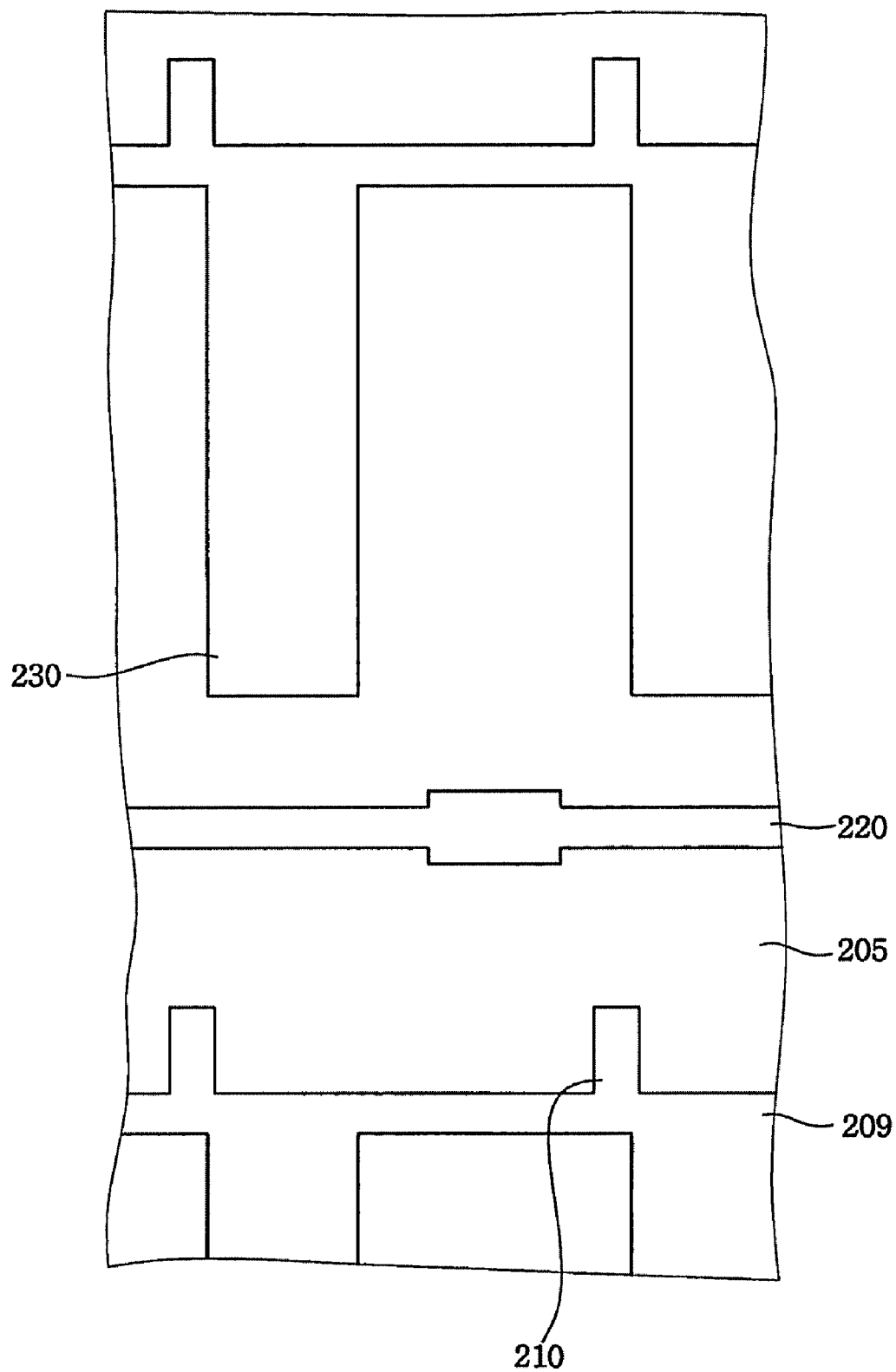
FIGS. 6A to 6D are layouts showing a process of manufacturing the transmissive and reflective type liquid crystal display apparatus of FIG. 4.

Referring to FIG. 6A, metal, for example, such as tantalum (Ta), titanium (Ti), molybdenum (Mo), aluminum (Al), chromium (Cr), cupper (Cu), tungsten (W), etc. is deposited on a transparent substrate 205 comprising glass or ceramic to form a metal layer. The metal layer is patterned to form a plurality of gate lines 209, a gate electrode line 210, a light blocking pattern 230 and a first storage electrode line 220. The gate lines 209 are extended in a horizontal direction, and arranged in a vertical direction. The gate electrode line 210 is protruded from the gate line 209. The light blocking pattern 230 is protruded from the gate line 209 to prevent a light leakage. The storage electrode line 220 is extended in a horizontal direction, so that the storage electrode line 220 is in parallel with the gate electrode lines 209.

Preferably, a width of the light blocking pattern 230 is larger than a width of a source line that is to be formed, and a length of the light blocking pattern 230 is larger than a length of a side portion of a transmissive window.

Then, silicon nitride is coated on the substrate having the gate electrode line 210 is formed thereon to form a gate insulation layer. For example, the silicon nitride may be coated via chemical vapor deposition. An amorphous silicon layer and n+ amorphous silicon layer are formed and patterned to form a semiconductor layer 214 and ohmic contact layer 216 in sequence. The gate insulation layer may be formed on entire surface of the substrate, or patterned to cover the gate line and gate electrode line.

Figure 6B:
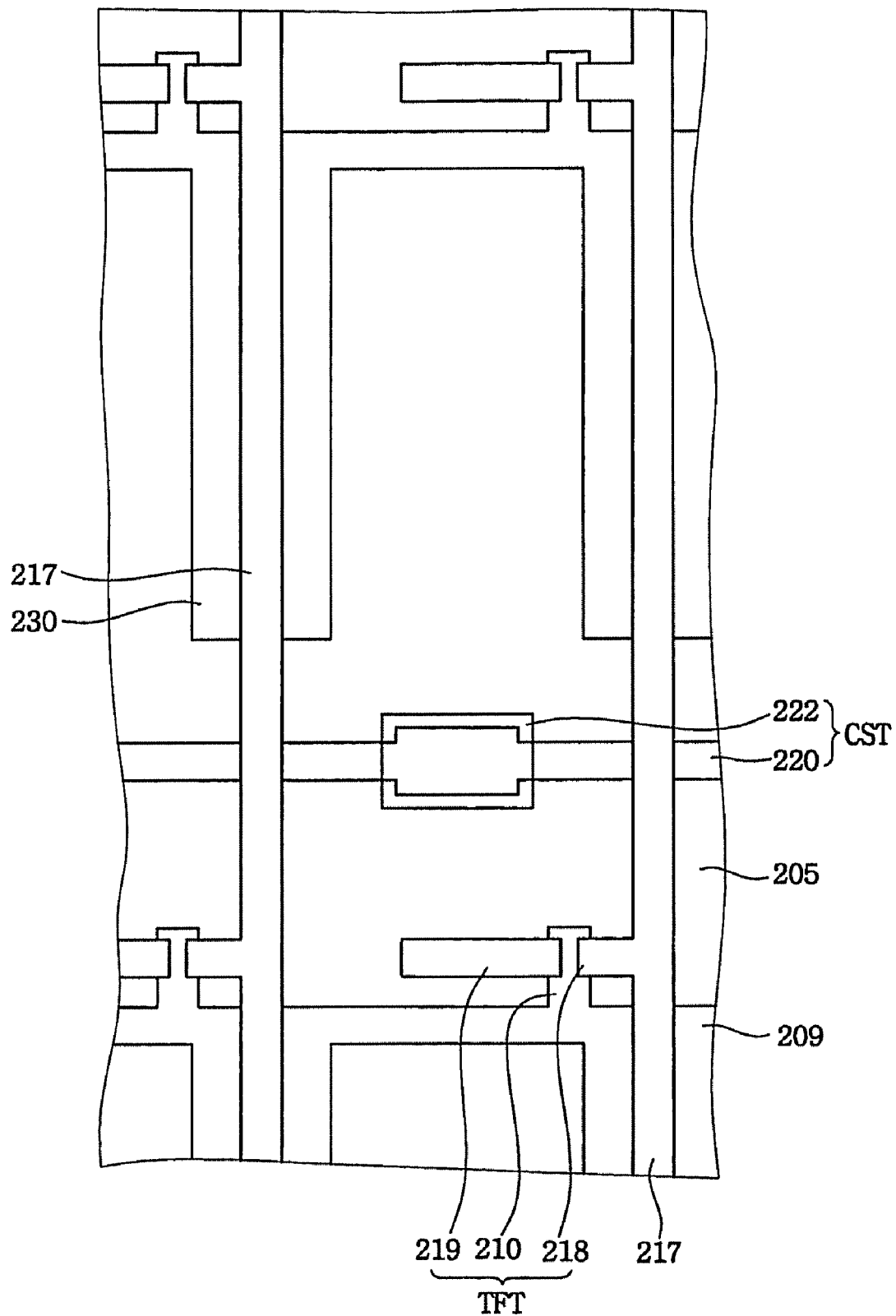

Referring to FIG. 6B, metal, for example, such as tantalum (Ta), titanium (Ti), molybdenum (Mo), aluminum (Al), chromium (Cr), cupper (Cu), tungsten (W), etc. is deposited on the semiconductor layer 214 to form a metal layer. Then, the metal layer is patterned to form a plurality of source lines 217, a source electrode line 218, a drain electrode line 219, and a second storage electrode line 222. The source lines 217 are extended in the vertical direction, and arranged in the horizontal direction. The source electrode line 218 is protruded from the source line 217. The drain electrode line 219 is spaced apart from the source electrode line 218. The second storage electrode line 222 is disposed over the first storage electrode line 220. The first and second storage electrode lines 220 and 222 form a storage capacitor CST.

Figure 6C:
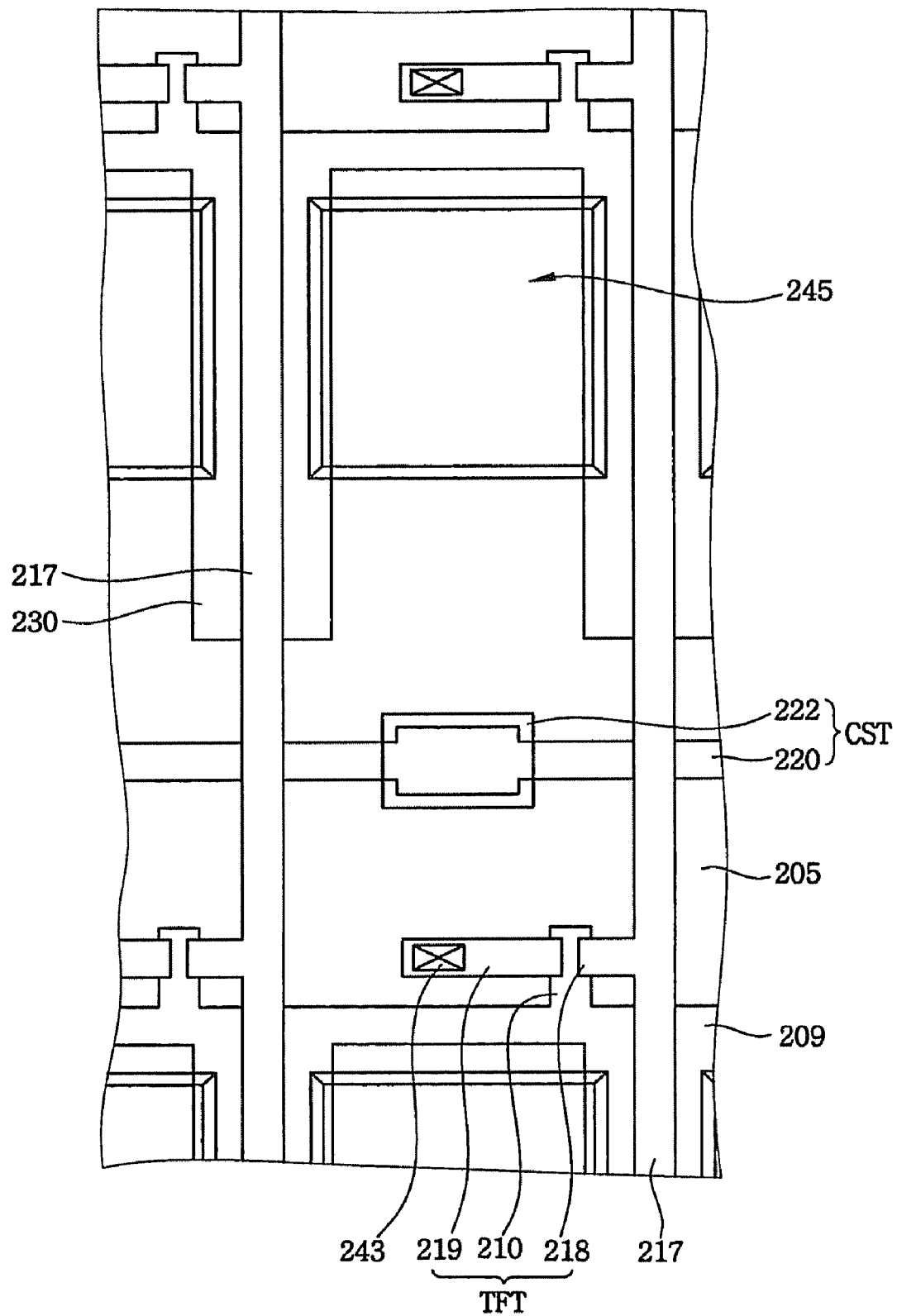

Referring to FIG. 6C, an organic insulation layer 242 is formed on the semiconductor layer via spin coating method. A portion of the organic insulation layer 242 is removed to form a contact hole 243 and a transmissive window 245. The contact hole 243 exposes the drain electrode line 219. A side portion of the transmissive window 245 is disposed over the light blocking pattern.

Figure 6D:
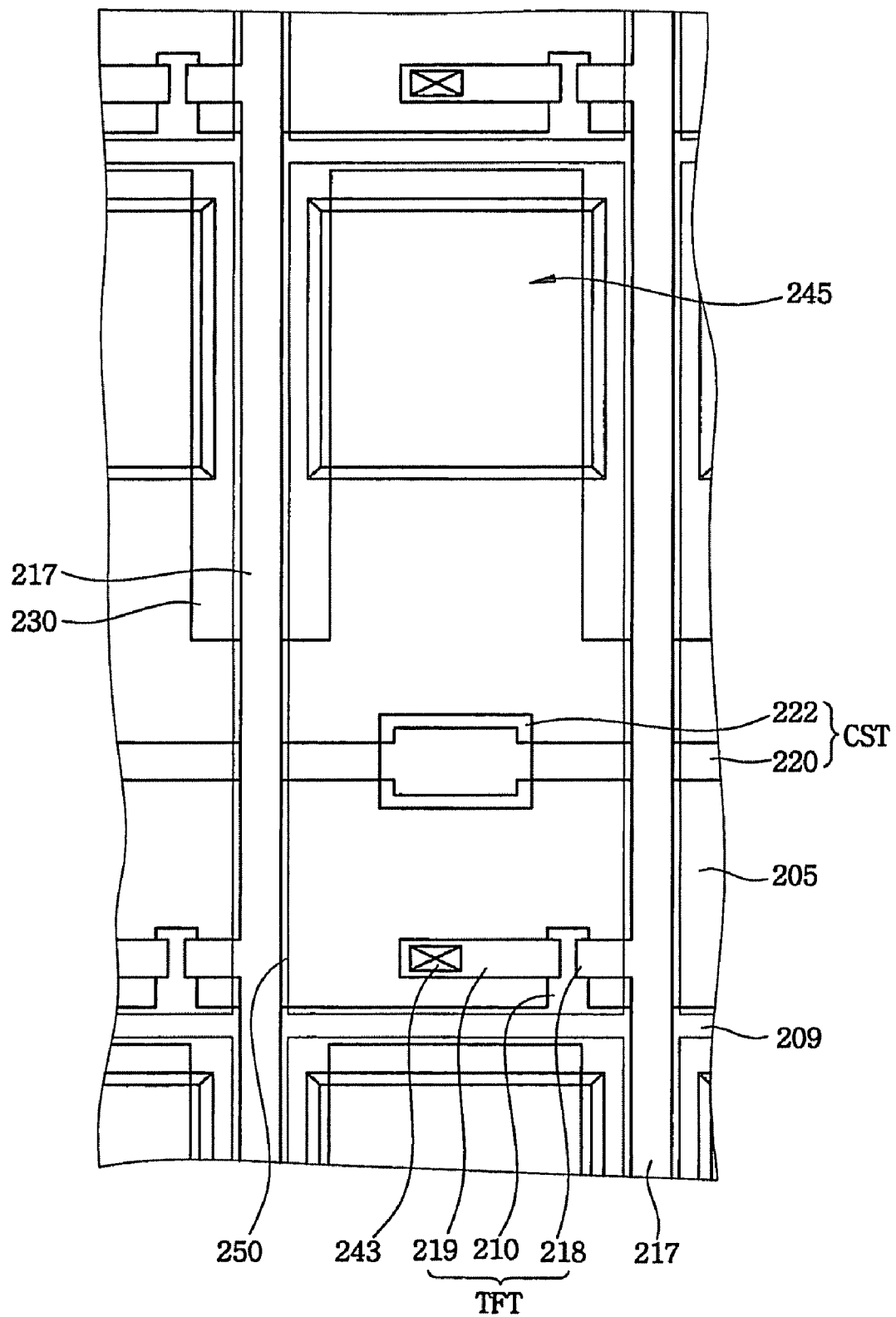

Referring to FIG. 6D, an indium tin oxide layer 250 is formed, such that the indium tin oxide layer 250 is electrically connected to the drain electrode line 218 via the contact hole 243. The indium tin oxide layer 250 is patterned to form a pixel electrode 250. The indium tin oxide layer 250 may be formed entirely and patterned to form the pixel electrode (hereinafter, a reference numeral 250 will be represents the pixel electrode) or the indium tin oxide layer may be formed on a region of the pixel electrode 250. For example, the pixel electrode 250 is spaced apart from the source line 217, but the pixel electrode 250 may overlap with the source line 217.

Then, a reflective layer 260 is formed in a pixel region. The reflective layer 260 is not formed in the transmissive window 245. Then, an alignment film (not shown) for aligning liquid crystal molecules in a rubbing direction is formed.

For example, the reflective layer 260 is formed to define a reflective region. However, the reflective layer 260 partitioned in accordance with the pixel may be formed. That is, the reflective layer may be formed on a region excluding a portion of a center of the gate line, a portion of a center of the source line and the transmissive region.

An embossing pattern for enhancing a reflectivity is formed on a surface of the organic insulation layer 242. However, a surface of the organic insulation layer may be flat.

Hereinbefore, for example, a transmissive and reflective type liquid crystal display apparatus having top ITO structure is explained. However, present invention may be applied to a transmissive and reflective type liquid crystal display apparatus having a bottom ITO structure.

Figure 7:
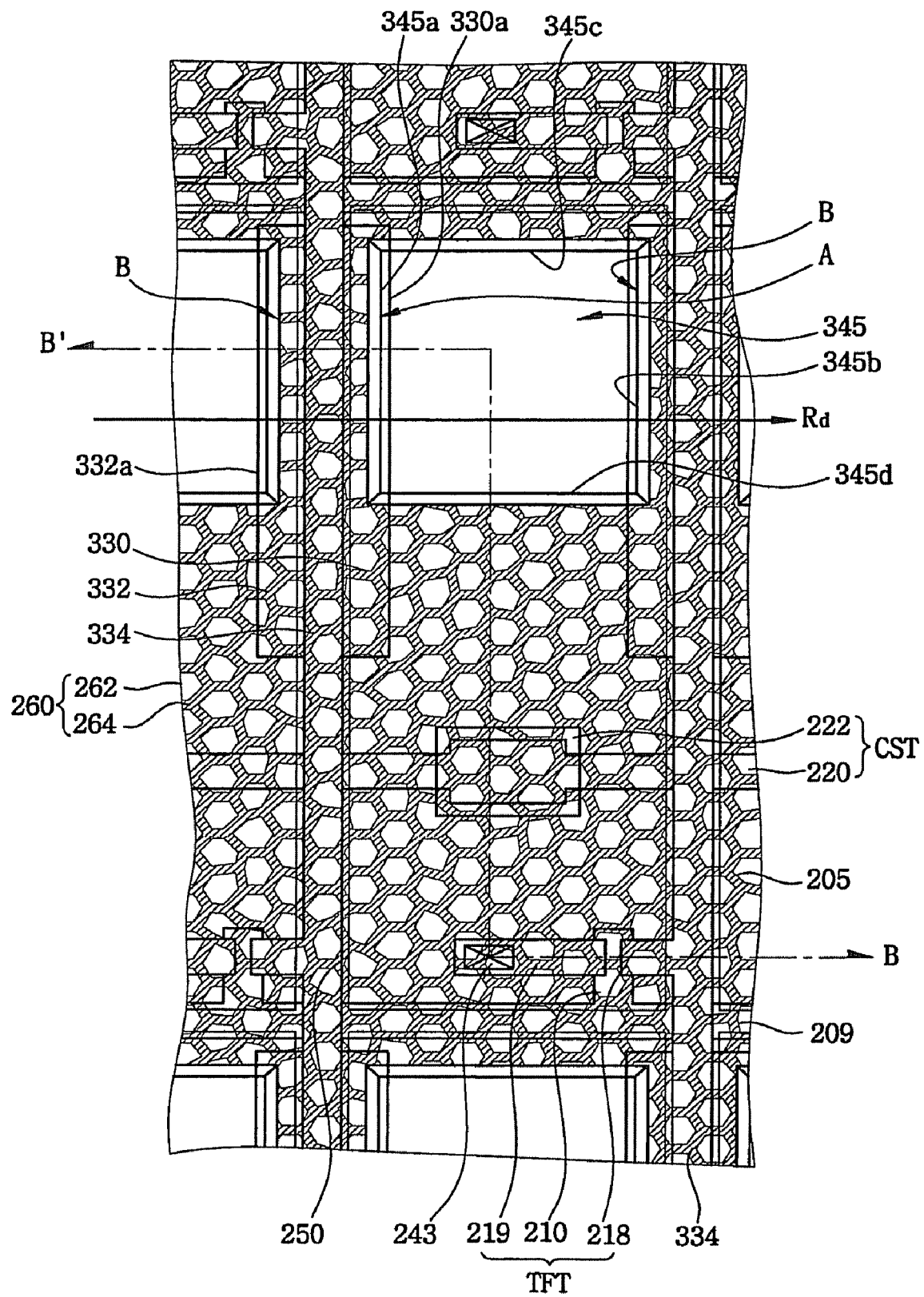
FIG. 7 is a plan view showing an array substrate of a transmissive and reflective type liquid crystal display apparatus according to a second exemplary embodiment of the present invention.

FIG. 7 is a plan view showing an array substrate of a transmissive and reflective type liquid crystal display apparatus according to a second exemplary embodiment of the present invention.

Referring to FIG. 7, a transmissive and reflective type liquid crystal display apparatus according to a second exemplary embodiment of the present invention includes a plurality of gate lines 209, a plurality of source lines 334, a thin film transistor TFT, a storage capacitor CST, first and second light blocking patterns 330 and 332, a pixel electrode 250 and a reflective layer 260. In FIG. 7, the same reference numerals denote the same elements in FIG. 4, and thus the detailed descriptions of the same elements will be omitted.

The first light blocking pattern 330 is spaced apart from the gate line 209. Therefore, the first light blocking pattern corresponds to a floating wiring through which electric signal is not applied. The first light blocking pattern 330 is longer than a side portion of the transmissive window, which is adjacent and parallel to the source line. A first end portion 330a of the first light blocking pattern 330 invades the transmissive window 345, so that the first end portion 330a of the first light blocking pattern 330 overlaps with the first side portion 345a of the transmissive window 345. The first light blocking pattern 330 also overlaps with the source line 334.

The second light blocking pattern 332 is spaced apart from the gate line 209, and the second light blocking pattern 332 is longer than a side portion of the transmissive window that is adjacent and parallel to the source line. A first end portion 332a of the second light blocking pattern 332 invades a second side portion 345b of the transmissive window that is adjacent to the transmissive window that overlaps with the first light blocking pattern 330, so that the first end portion 332a of the transmissive window overlaps with the second side portion 345b of the transmissive window 345. The second light blocking pattern 332 also overlaps with the source line 334. Therefore, according to the present embodiment, two separate light blocking patterns are formed to cover the first and second end portions 345a and 345b, respectively.

For example, when a rubbing direction turns toward right side, a strong light leakage is prevented by the first light blocking pattern 330, and a weak light leakage is prevented by the second light blocking pattern 332. In order to increase an aperture ratio, the second light blocking pattern 332 may be omitted.

Hereinbefore, as an example, a transmissive and reflective type liquid crystal display apparatus having a top ITO structure was explained. However, the present embodiment may be employed to a transmissive and reflective type liquid crystal display apparatus having a bottom ITO structure.

Figure 8:
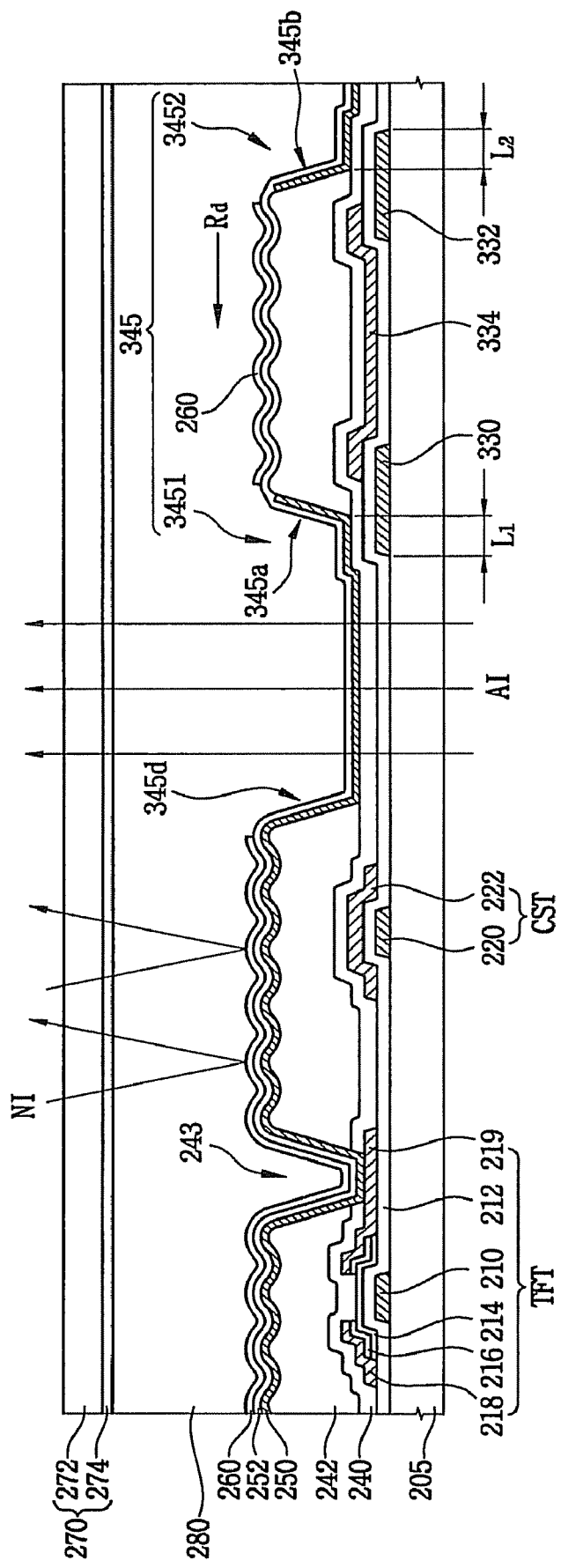
FIG. 8 is a cross-sectional view taken along a line B-B' of FIG. 7.

FIG. 8 is a cross-sectional view taken along a line B-B' of FIG. 7. Reference numeral.

Referring to FIG. 8, a transmissive and reflective type liquid crystal display apparatus includes an array substrate, a color filter substrate 270 and a liquid crystal layer 280 interposed between the array substrate and the color filter substrate 270. In FIG. 8, the same reference numerals denote the same elements in FIG. 5, and thus the detailed descriptions of the same elements will be omitted.

The array substrate includes first and second light blocking patterns 330 and 332, and a source line 334. The first and second light blocking patterns 330 and 332 are formed via a process forming the gate line 209. A portion of the source line 334 overlaps with the first and second light blocking patterns 330 and 332.

The first light blocking pattern 330 is spaced apart from the gate line 209, and the first light blocking pattern 330 is longer than a first side portion 345a of a first transmissive window 3451. The first light blocking pattern 330 overlaps with the first side portion 345a of the first transmissive window 3451 by a first length L1, and the second light blocking pattern 332 overlaps with the second side portion 345b of the second transmissive window 3452 by a second length L2. Therefore, a strong light leakage occurring at a first boundary 'A' of an organic insulation layer 242 disposed at the first side portion 345a, and a weak light leakage occurring at a second boundary 'B' of an organic insulation layer 242 disposed at the second side portion 345b are prevented.

In the second embodiment, a transmissive and reflective type liquid crystal display apparatus having a top ITO structure is explained for example. However, the second embodiment may be employed to a transmissive and reflective type liquid crystal display apparatus having a bottom type ITO structure.

Additionally, in the second embodiment, the reflective layer is formed on the pixel electrode. However, the pixel electrode may be formed on the reflective layer.

FIGS. 9A to 9D are layouts showing a process of manufacturing the transmissive and reflective type liquid crystal display apparatus of FIG. 7.

Figure 9A:
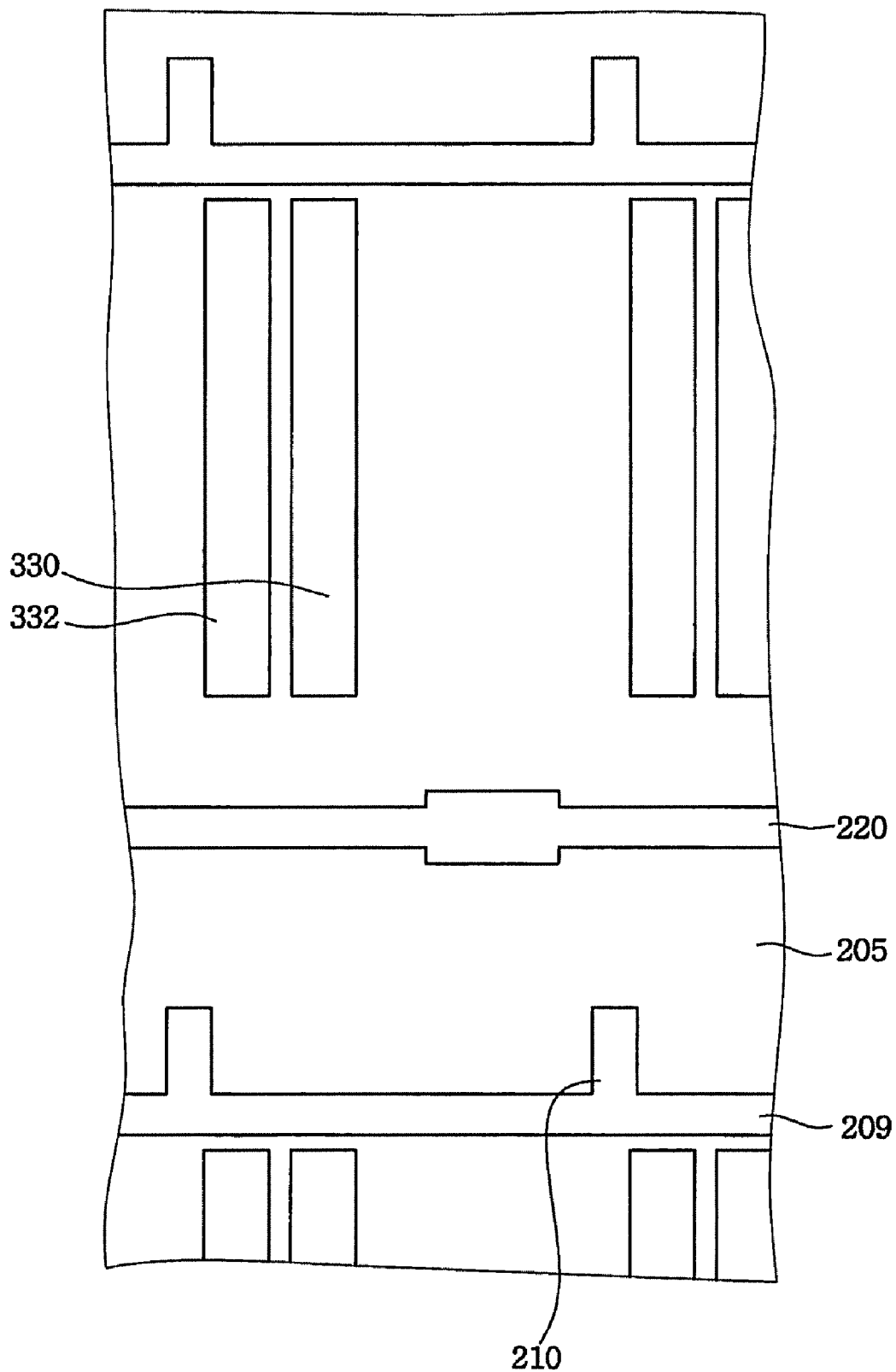
FIGS. 9A to 9D are layouts showing a process of manufacturing the transmissive and reflective type liquid crystal display apparatus of FIG. 7.

Referring to FIG. 9A, metal, for example, such as tantalum (Ta), titanium (Ti), molybdenum (Mo), aluminum (Al), chromium (Cr), cupper (Cu), tungsten (W), etc. is deposited on a transparent substrate 205 comprising glass or ceramic to form a metal layer. The metal layer is patterned to form a plurality of gate lines 209, a gate electrode line 210, first and second light blocking patterns 330 and 332, and a first storage electrode line 220. The gate lines 209 are extended in a horizontal direction, and arranged in a vertical direction. The gate electrode line 210 is protruded from the gate line 209. The first and second light blocking patterns 330 and 332 are spaced apart from the gate line 209. The storage electrode line 220 is extended in a horizontal direction, so that the storage electrode line 220 is in parallel with the gate electrode lines 209.

Preferably, a length of the first and second light blocking pattern 330 and 332 is larger than a length of a side portion of a transmissive window.

Then, silicon nitride is coated on the substrate having the gate electrode line 210 is formed thereon to form a gate insulation layer. For example, the silicon nitride may be coated via chemical vapor deposition. An amorphous silicon layer and n+ amorphous silicon layer are formed and patterned to form a semiconductor layer 214 and ohmic contact layer 216 in sequence. The gate insulation layer may be formed on entire surface of the substrate, or patterned to cover the gate line and gate electrode line.

Figure 9B:
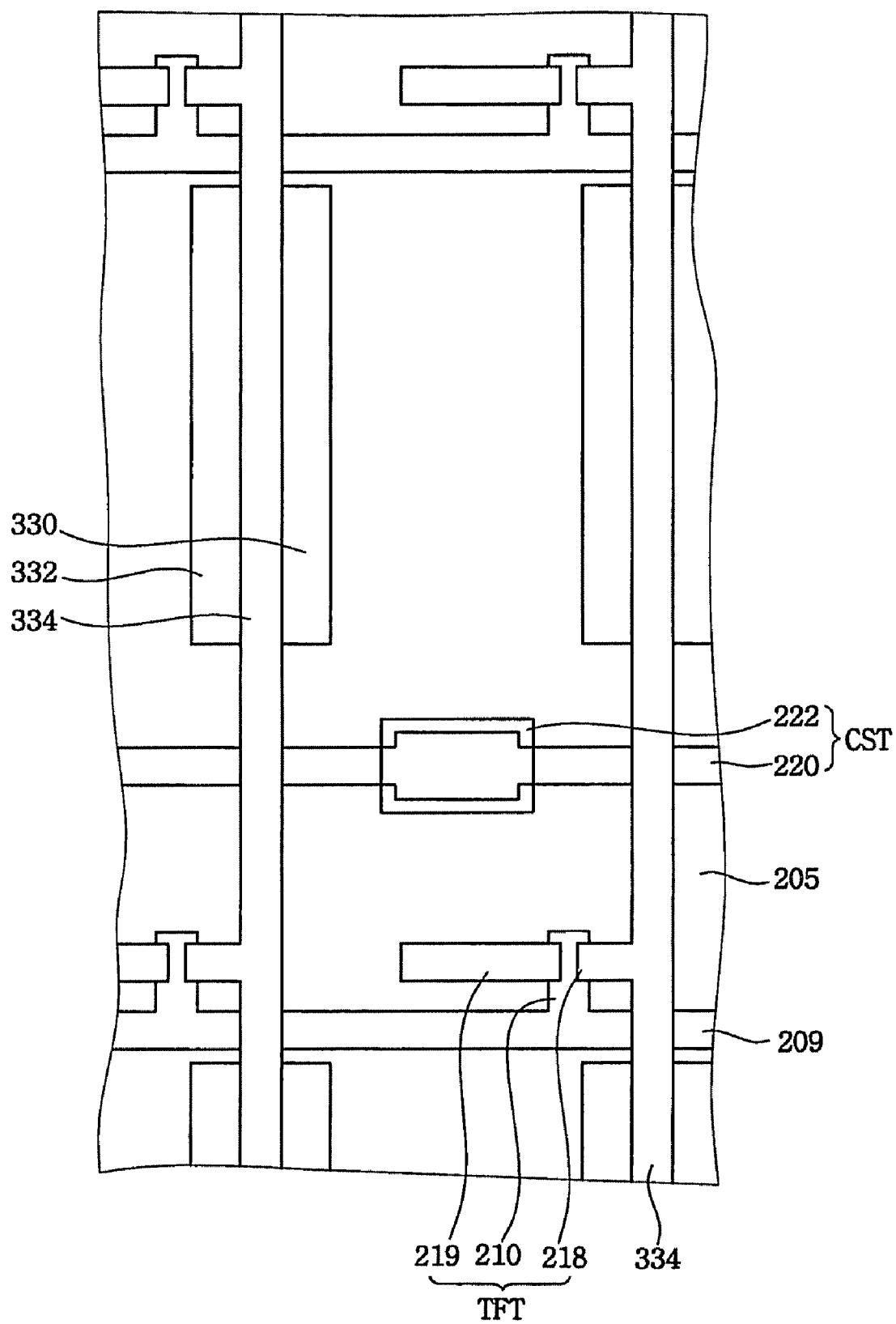

Referring to FIG. 9B, metal, for example, such as tantalum (Ta), titanium (Ti), molybdenum (Mo), aluminum (Al), chromium (Cr), cupper (Cu), tungsten (W), etc. is deposited on the semiconductor layer 214 to form a metal layer. Then, the metal layer is patterned to form a plurality of source lines 334, a source electrode line 218, a drain electrode line 219, and a second storage electrode line 222. The source lines 334 are extended in the vertical direction, and arranged in the horizontal direction. The source electrode line 218 is protruded from the source line 334. The drain electrode line 219 is spaced apart from the source electrode line 218. The second storage electrode line 222 is disposed over the first storage electrode line 220. The first and second storage electrode lines 220 and 222 form a storage capacitor CST.

Figure 9C:
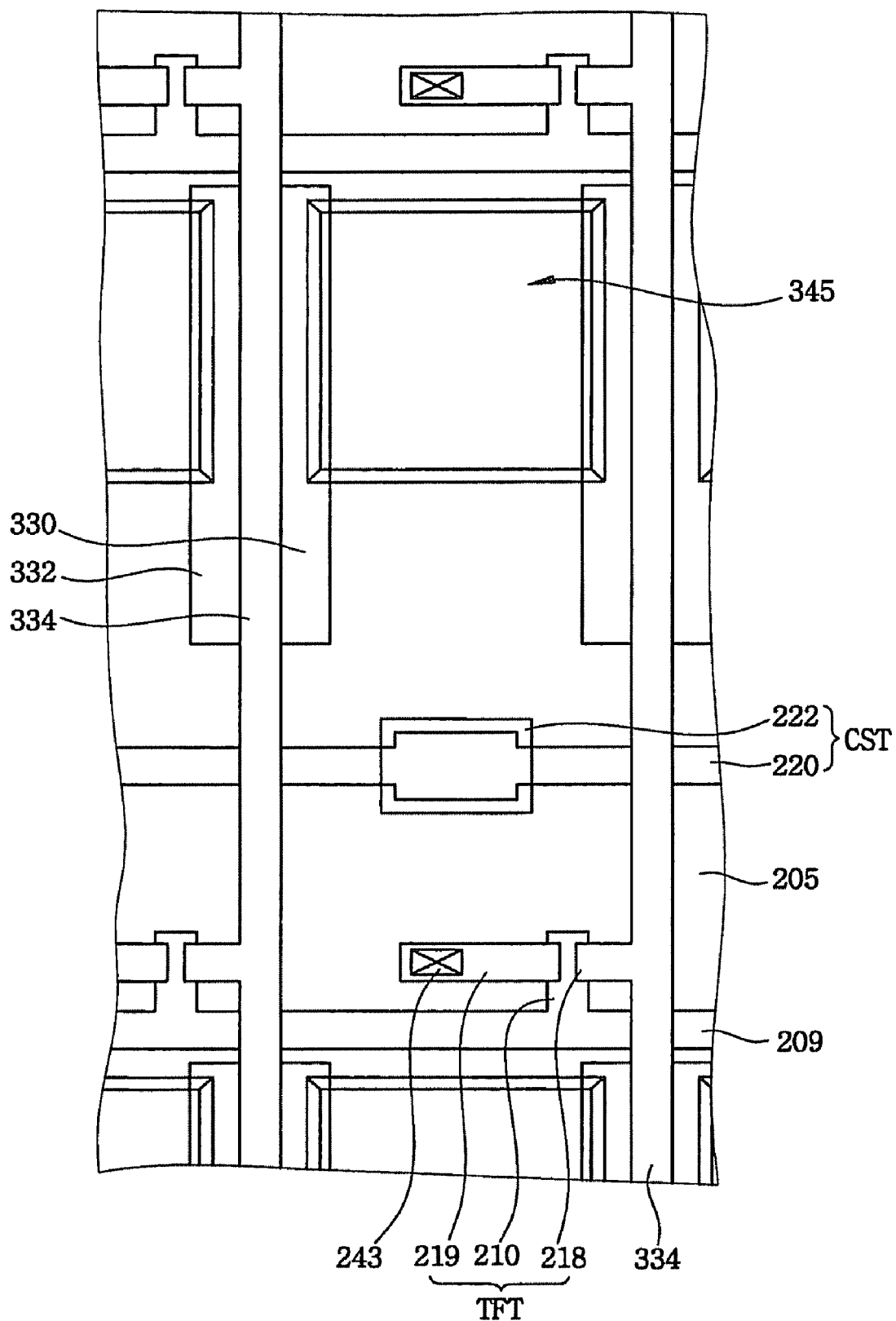

Referring to FIG. 9C, an organic insulation layer 242 is formed on the semiconductor layer via spin coating method. A portion of the organic insulation layer 242 is removed to form a contact hole 243 and a transmissive window 345. The contact hole 243 exposes the drain electrode line 219. A side portion of the transmissive window 345 is disposed over the light blocking pattern.

Figure 9D:
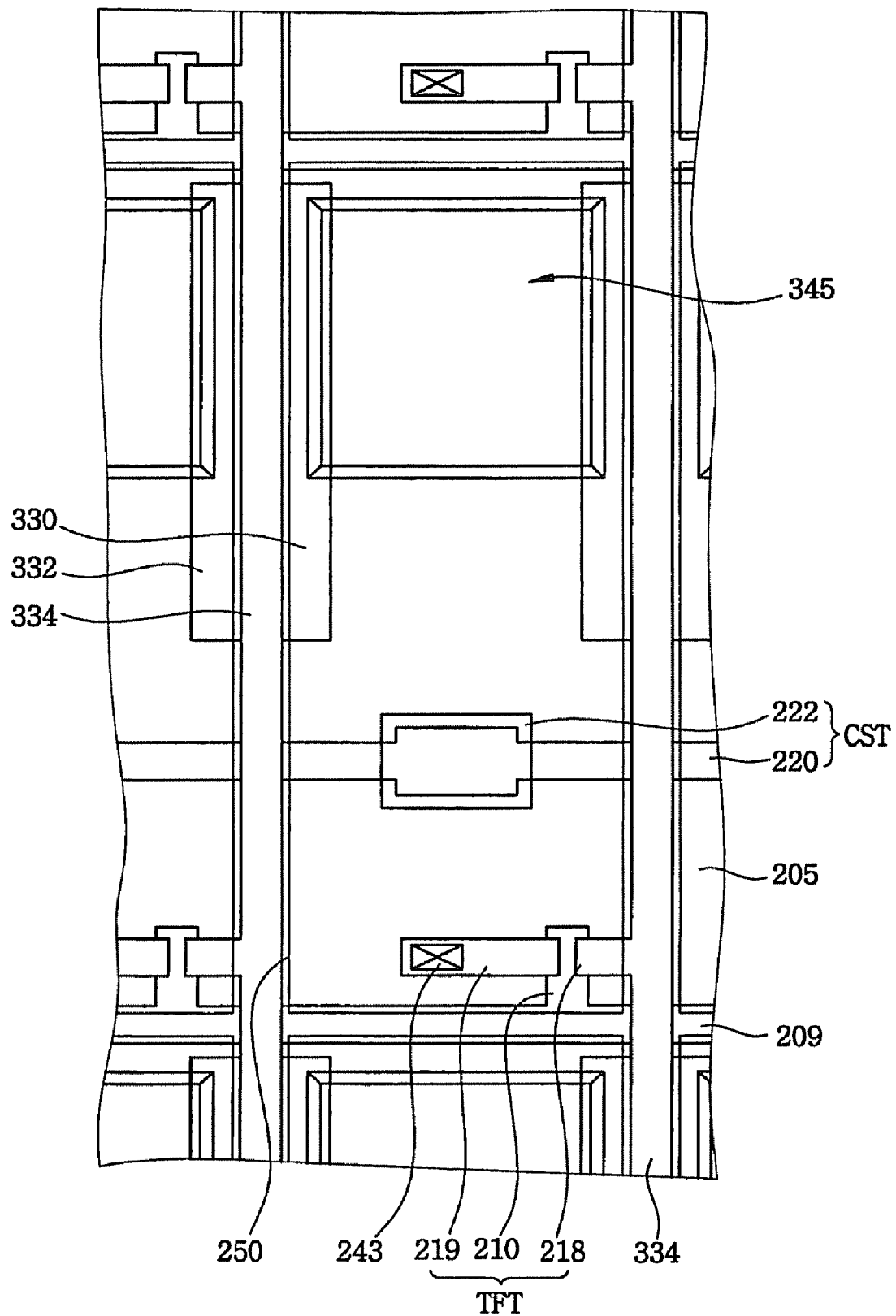

Referring to FIG. 9D, an indium tin oxide layer 250 is formed, such that the indium tin oxide layer 250 is electrically connected to the drain electrode line 218 via the contact hole 243. The indium tin oxide layer 250 is patterned to form a pixel electrode 250. The indium tin oxide layer 250 may be formed entirely and patterned to form the pixel electrode (hereinafter, a reference numeral 250 will be represents the pixel electrode) or the indium tin oxide layer may be formed on a region of the pixel electrode 250. For example, the pixel electrode 250 is spaced apart from the source line 217, but the pixel electrode 250 may overlap with the source line 217.

Then, a reflective layer 260 is formed in a pixel region. The reflective layer 260 is not formed in the transmissive window 245. Then, an alignment film (not shown) for aligning liquid crystal molecules in a rubbing direction is formed.

A reflective layer 260 is formed on the pixel electrode 250. Additionally, an alignment film (not shown) is formed on the reflective layer 260. Then, the array substrate is completed.

Figure 10:
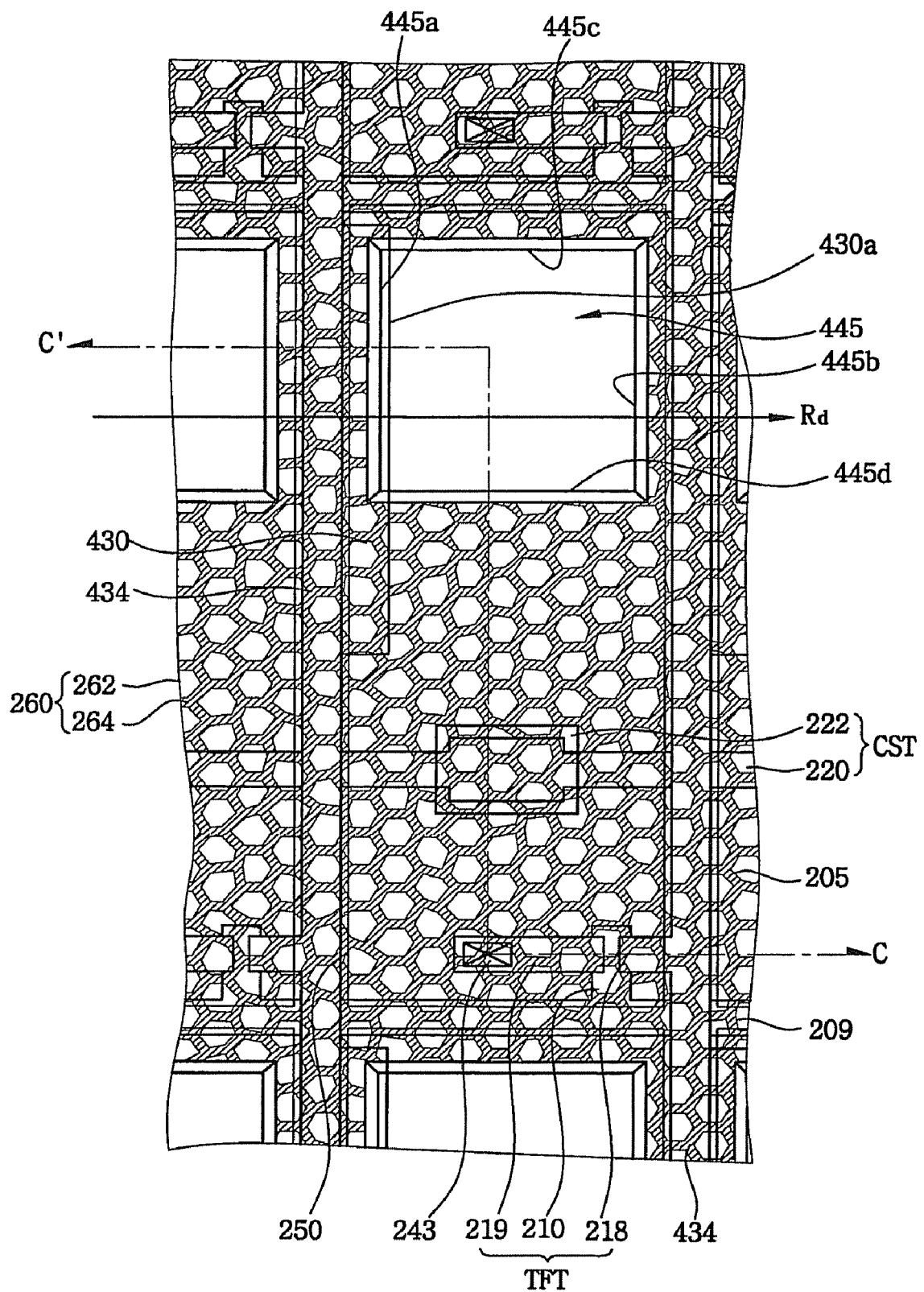
FIG. 10 is a plan view showing a transmissive and reflective type liquid crystal display apparatus according to a third exemplary embodiment of the present invention.

FIG. 10 is a plan view showing a transmissive and reflective type liquid crystal display apparatus according to a third exemplary embodiment of the present invention.

Referring to FIG. 10, a liquid crystal display apparatus according to a third exemplary embodiment of the present invention includes a plurality of gate electrode 209, a plurality of source line 434, a thin film transistor TFT, a storage capacitor CST, a light blocking pattern 430, a pixel electrode 250 and a reflective layer 260 disposed in the reflective region. The reflective layer 260 defines reflective and transmissive regions (or windows). In FIG. 10, the same reference numerals denote the same elements in FIG. 4, and thus the detailed descriptions of the same elements will be omitted.

The light blocking pattern 430 is formed via a process of forming the gate lines 209, such that the light blocking pattern 430 is longer than a side portion of the reflective windows that is adjacent to the source lines 434. Additionally, a first end portion 430a of the light blocking pattern 430 invades the transmissive window 445, so that the light blocking pattern 430 overlaps with a first side portion 445a of the transmissive window 445. The light blocking pattern 430 also overlaps with the source line 434.

Therefore, when the rubbing direction turns toward right side of FIG. 10, the light blocking pattern 430 prevents a light leakage.

In case that the rubbing direction turns toward upper side of FIG. 10, the light blocking pattern is formed, such that the light blocking pattern overlaps with the lower side portion of the transmissive window 445.

In case that the rubbing direction turns toward one or two o'clock direction, the light blocking pattern is formed, such that the light blocking pattern overlaps with the lower and left side of the transmissive window 445.

In case that the rubbing direction turns toward ten or eleven o'clock direction, the light blocking pattern is formed, such that the light blocking pattern overlaps with the upper and right side of the transmissive window 445.

In the present embodiment, an array substrate having a top ITO structure, in which the pixel electrodes comprising indium tin oxide (ITO) is formed on the organic insulation layer, is employed in order to explain the present embodiment. However, the present embodiment may be applied to a bottom ITO structure, in which the pixel electrodes is formed under the organic insulation layer.

Further, the reflective layer is formed on the pixel electrode in the present embodiment. However, the pixel electrode may be formed on the reflective layer.

FIG. 11 is a cross-sectional view taken along a line C-C' of FIG. 10.

Referring to FIG. 11, a transmissive and reflective type liquid crystal display apparatus according to a third exemplary embodiment of the present invention includes an array substrate, a color filter substrate 270 and a liquid crystal layer 280 interposed between the array substrate and the color filter substrate 270. In FIG. 11, the same reference numerals denote the same elements in FIG. 5, and thus the detailed descriptions of the same elements will be omitted.

The array substrate includes a light blocking pattern 430 and a source line 434. The light blocking pattern 430 is formed via a process of forming a gate line 209, such that the light blocking pattern 430 is spaced apart from the gate line 209 and the light blocking pattern 430 is longer than a first side portion 445a of the transmissive window 445. The light blocking pattern 430 overlaps with the first side portion 445a of the transmissive window 445 by a length L. Therefore, a light leakage occurring at a first boundary A is prevented.

FIGS. 12A to 12D are layouts showing a process of manufacturing the transmissive and reflective type liquid crystal display apparatus of FIG. 10.

Figure 12A:
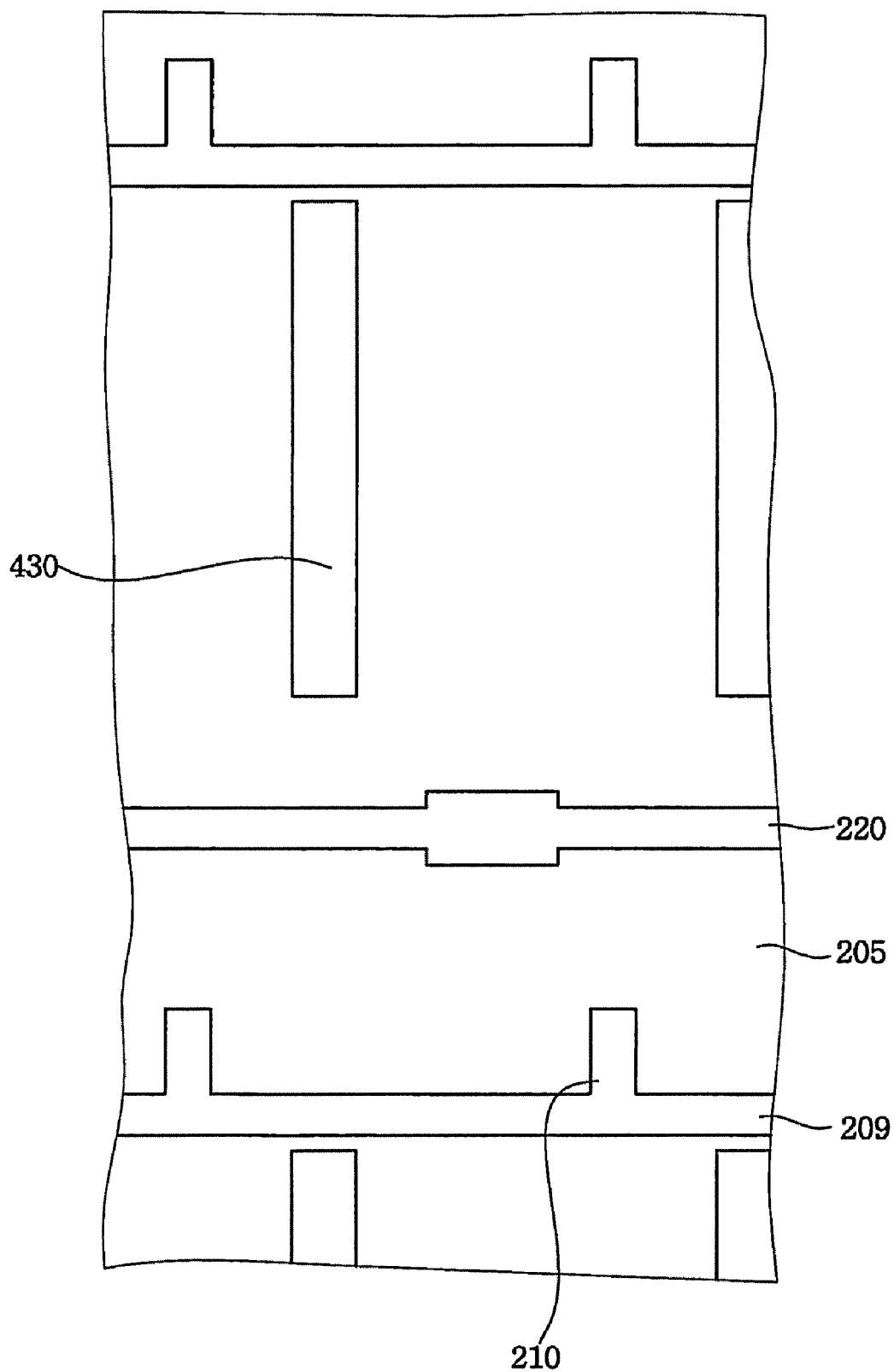
FIGS. 12A to 12D are layouts showing a process of manufacturing the transmissive and reflective type liquid crystal display apparatus of FIG. 10.

Referring to FIG. 12A, metal, for example, such as tantalum (Ta), titanium (Ti), molybdenum (Mo), aluminum (Al), chromium (Cr), cupper (Cu), tungsten (W), etc. is deposited on a transparent substrate 205 comprising glass or ceramic to form a metal layer. The metal layer is patterned to form a plurality of gate lines 209, a gate electrode line 210, a light blocking pattern 430 and a first storage electrode line 220. The gate lines 209 are extended in a horizontal direction, and arranged in a vertical direction. The gate electrode line 210 is protruded from the gate line 209. The light blocking pattern 430 is spaced apart from the gate line 209. The storage electrode line 220 is extended in a horizontal direction, so that the storage electrode line 220 is in parallel with the gate electrode lines 209.

Preferably, a length of the light blocking pattern 230 is larger than a length of a side portion of a transmissive window.

Then, silicon nitride is coated on the substrate having the gate electrode line 210 is formed thereon to form a gate insulation layer. For example, the silicon nitride may be coated via chemical vapor deposition. An amorphous silicon layer and n+ amorphous silicon layer are formed and patterned to form a semiconductor layer 214 and ohmic contact layer 216 in sequence. The gate insulation layer may be formed on entire surface of the substrate, or patterned to cover the gate line and gate electrode line.

Figure 12B:
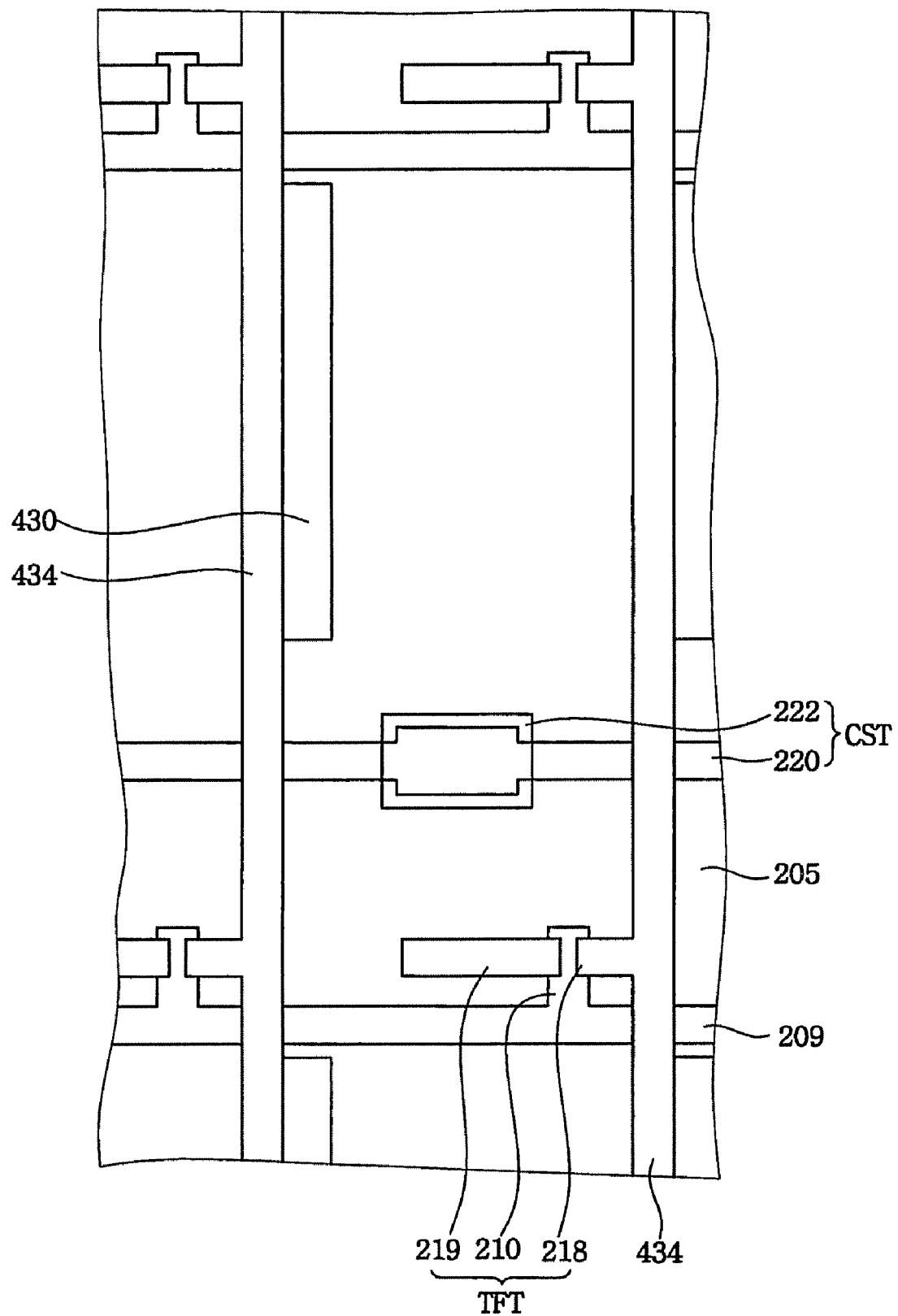

Referring to FIG. 12B, metal, for example, such as tantalum (Ta), titanium (Ti), molybdenum (Mo), aluminum (Al), chromium (Cr), cupper (Cu), tungsten (W), etc. is deposited on the semiconductor layer 214 to form a metal layer. Then, the metal layer is patterned to form a plurality of source lines 434, a source electrode line 218, a drain electrode line 219, and a second storage electrode line 222. The source lines 434 are extended in the vertical direction, and arranged in the horizontal direction. The source electrode line 218 is protruded from the source line 434. The drain electrode line 219 is spaced apart from the source electrode line 218. The second storage electrode line 222 is disposed over the first storage electrode line 220. The first and second storage electrode lines 220 and 222 form a storage capacitor CST.

Figure 12C:
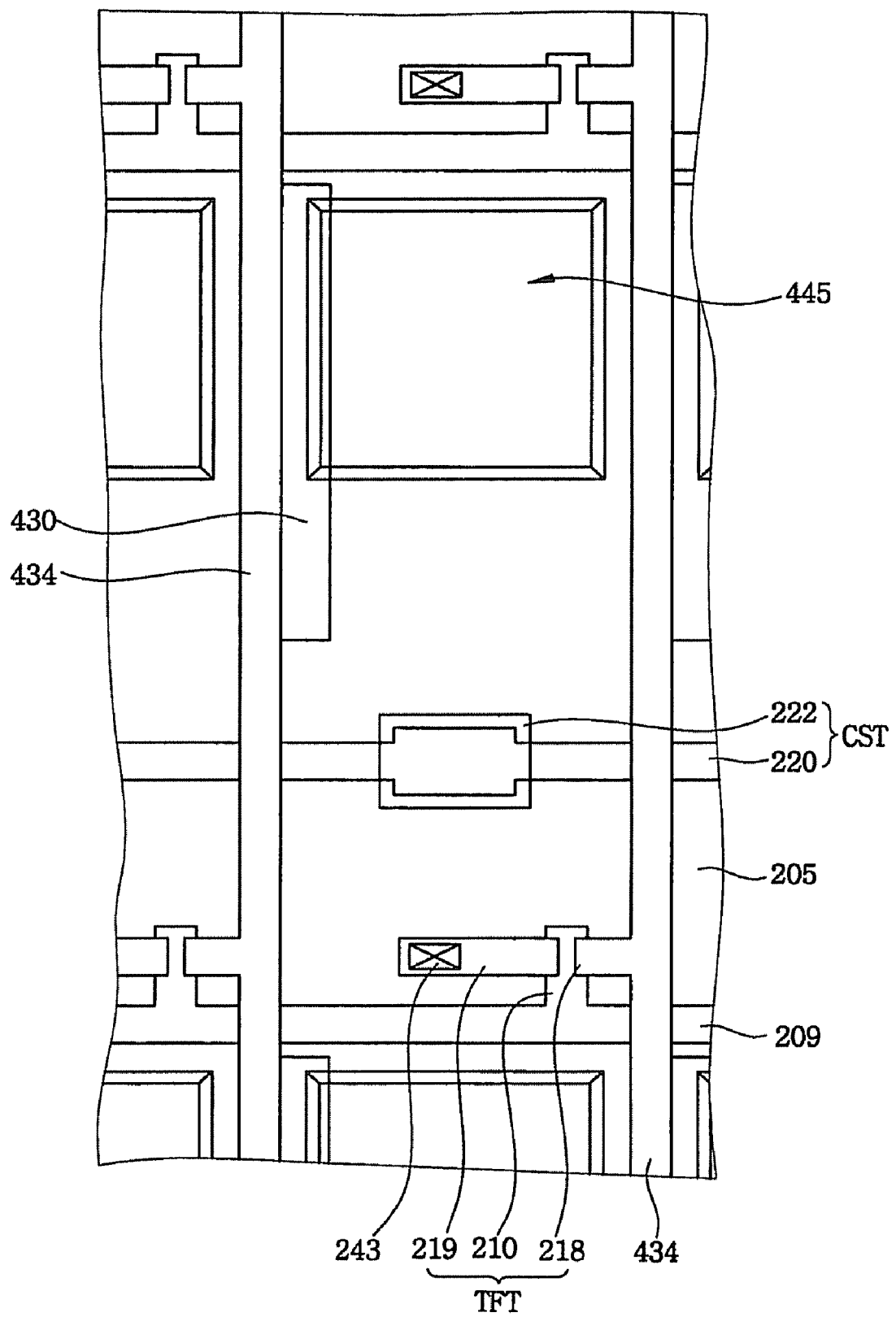

Referring to FIG. 12C, an organic insulation layer 242 is formed on the semiconductor layer via spin coating method. A portion of the organic insulation layer 242 is removed to form a contact hole 243 and a transmissive window 445. The contact hole 243 exposes the drain electrode line 219. A side portion of the transmissive window 245 is disposed over the light blocking pattern.

Figure 12D:
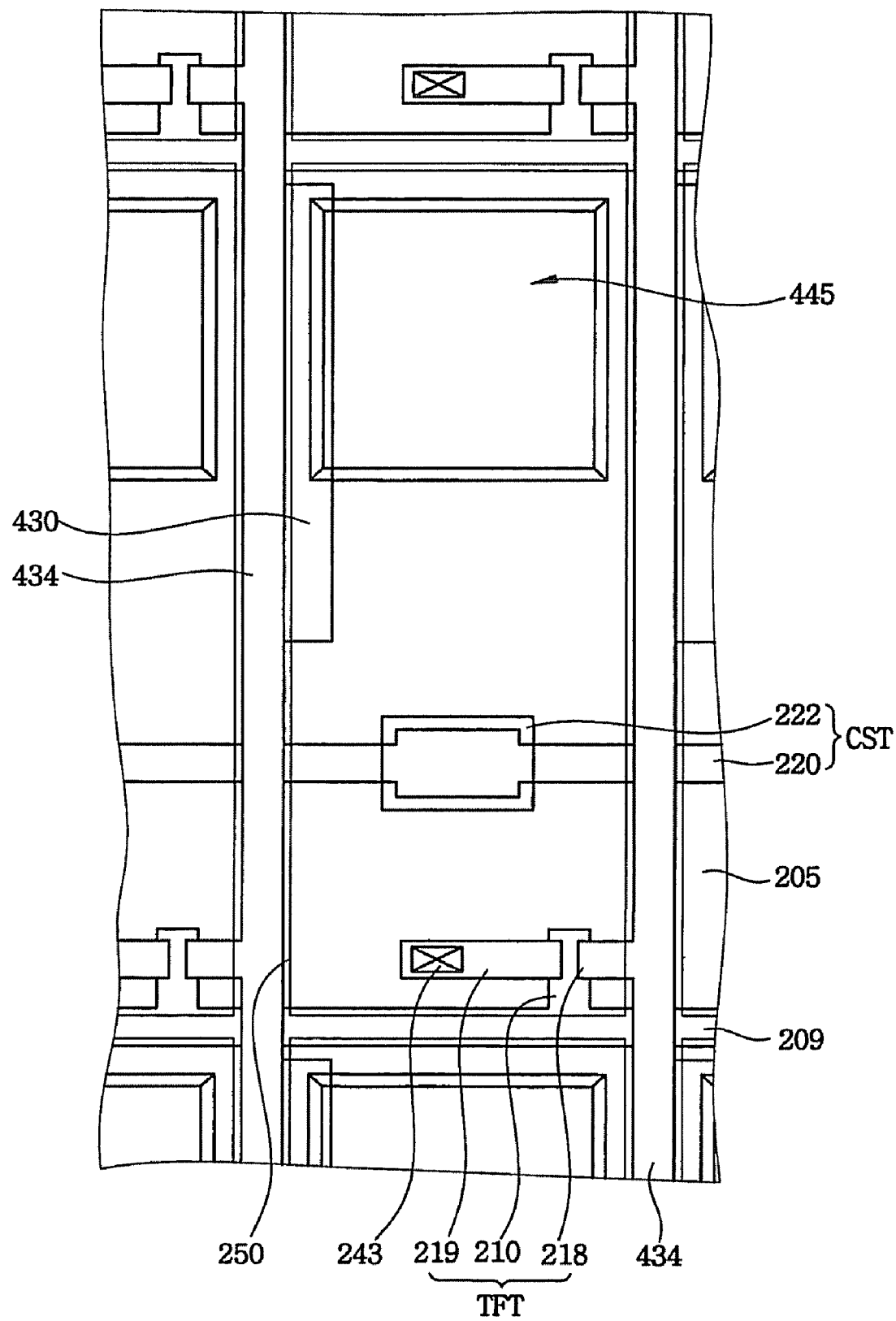

Referring to FIG. 12D, an indium tin oxide layer 250 is formed, such that the indium tin oxide layer 250 is electrically connected to the drain electrode line 218 via the contact hole 243. The indium tin oxide layer 250 is patterned to form a pixel electrode 250. The indium tin oxide layer 250 may be formed entirely and patterned to form the pixel electrode (hereinafter, a reference numeral 250 will be represents the pixel electrode) or the indium tin oxide layer may be formed on a region of the pixel electrode 250. For example, the pixel electrode 250 is spaced apart from the source line 217, but the pixel electrode 250 may overlap with the source line 217.

Then, a reflective layer 260 is formed in a pixel region. The reflective layer 260 is not formed in the transmissive window 245. Then, an alignment film (not shown) for aligning liquid crystal molecules in a rubbing direction is formed.

Hereinbefore, the light blocking pattern protruded from the gate line or spaced apart from the gate line, which corresponding to a boundary of the transmissive and reflective regions, prevents a light leakage. However, except for the gate line, a separate floating wiring may form the light blocking pattern.

For example, when a plurality of gate lines and a plurality of data lines are formed on a first surface of the substrate, a floating line corresponding to the boundary region may be formed on a second surface of the substrate.

The light leakage above described is caused by an abnormal arrangement of liquid crystal molecules. Therefore, the light leakage may be reduced by reducing a pretilt angle with respect to the substrate.

Hereinafter, an array substrate for reducing the pretilt angle with respect to the substrate will be explained.

Figure 13:
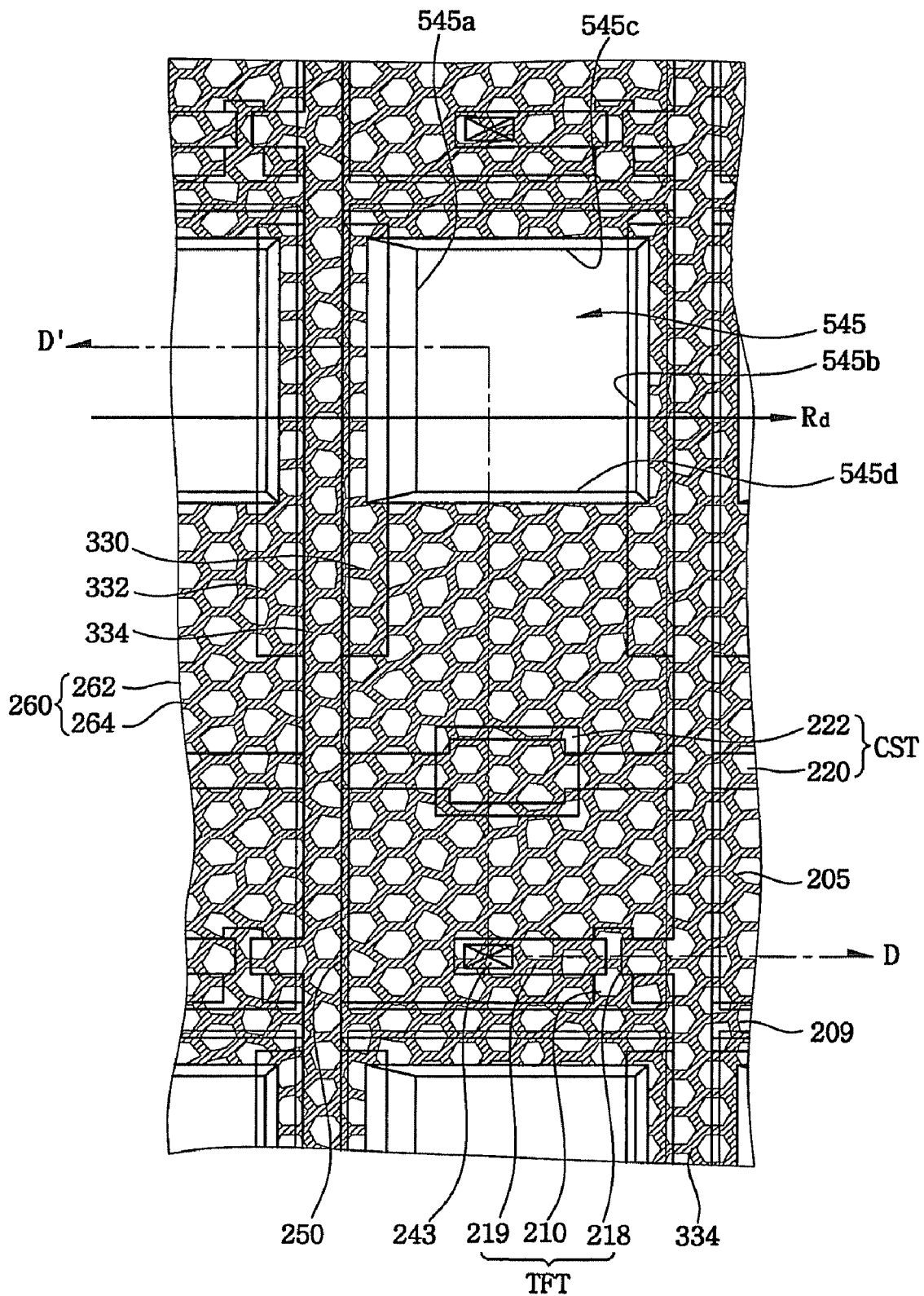
FIG. 13 is a plan view showing a transmissive and reflective type liquid crystal display apparatus according to a fourth exemplary embodiment of the present invention.

FIG. 13 is a plan view showing a transmissive and reflective type liquid crystal display apparatus according to a fourth exemplary embodiment of the present invention.

Referring to FIG. 13, a liquid crystal display apparatus according to a fourth exemplary embodiment of the present invention includes a plurality of gate lines 209, a plurality of source lines 334, a thin film transistor TFT, a storage capacitor CST, first and second light blocking patterns 330 and 332, a pixel electrode 250 and a reflective layer 260 defining reflective and transmissive regions (or windows). In FIG. 13, the same reference numerals denote the same elements in FIG. 7, and thus the detailed descriptions of the same elements will be omitted.

The reflective layer 260 is formed in the reflective region, which reflects an ambient light. A light generated from a backlight assembly is transmitted through the transmissive region. The light generated from the backlight assembly passes through a gate insulation layer exposed by removing a portion of an organic insulation layer. The reflective layer 260 is not formed in the transmissive region, so that the reflective layer 260 does not block the light generated from the backlight assembly. Therefore, the transmissive region corresponds to a region where the reflective layer 260 is not formed, and the reflective region corresponds to a region where the reflective layer 260 is formed.

An inclination angle of a first inclined portion that is disposed between the reflective region and the transmissive region in that sequence along the rubbing direction is smaller than an inclination angle of a second inclined portion that is disposed between the transmissive region and the reflective region in that sequence along the rubbing direction with respect to the substrate. Therefore, liquid crystal molecules of the first inclined portion, where light leakage occurs much, resemble liquid crystal molecules of a flat region, leading to reduce the light leakage.

For example, when an alignment film is rubbed along the rubbing direction Rd as shown in FIG. 13, a light leakage of the first side portion 545a of the transmissive window 545 is more severe than a light leakage of the second side portion 545b of the transmissive window 545. However, according to the present embodiment, the inclination angle of the first inclined portion that corresponds to the first side portion 545a is reduced with respect to the substrate, so that the light leakage is reduced. Additionally, the first light blocking pattern 330 prevents the light leakage.

Furthermore, the second light blocking pattern 332 corresponding to the second side portion 545b prevents a weak light leakage. The first and second light blocking patterns 330 and 332 may be omitted, or only the second light blocking pattern 330 and 332 may be omitted in order to increase an aperture ratio.

Figure 14:
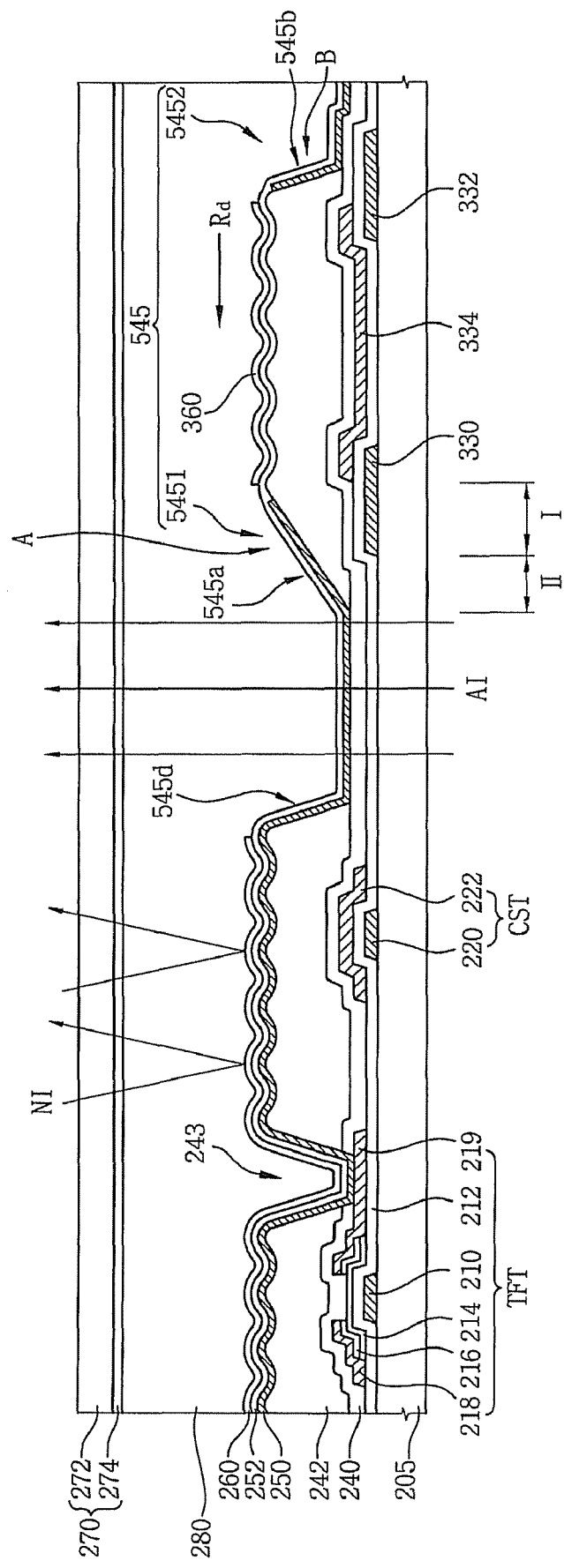
FIG. 14 is a cross-sectional view taken along a line D-D' of FIG. 13.

FIG. 14 is a cross-sectional view taken along a line D-D' of FIG. 13.

Referring to FIG. 14, a transmissive and reflective type liquid crystal display apparatus includes an array substrate, a color filter substrate 270 and a liquid crystal layer interposed between the array substrate and the color filter substrate 270. In FIG. 14, the same reference numerals denote the same elements in FIG. 8, and thus the detailed descriptions of the same elements will be omitted.

The array substrate includes first and second light blocking patterns 330 and 332, and a source line 334. The first and second light blocking patterns 330 and 332 are formed via a process of forming a gate line 209.

The first light blocking pattern 330 is spaced apart from the gate line 209, and the first light blocking pattern 330 is longer than a first side portion 545a of a first transmissive window 5451. The first light blocking pattern 330 is widened, so that the first light blocking pattern 330 overlaps with the first side portion 545a of the first transmissive window 5451 by a predetermined length 'l'. The second light blocking pattern 332 is spaced apart from the gate line 209, and the second light blocking pattern 332 is longer than a second side portion 5456b of a second transmissive window 5452 that is adjacent to the first transmissive window 5451. The second light blocking pattern 332 is widened, so that the second light blocking pattern 332 overlaps with the second side portion 545b. Therefore, the first light blocking pattern 330 prevents a strong light leakage occurring at the first boundary 'A' of the organic insulation layer 242, which is disposed at the first side portion 545a. Additionally, the second light blocking pattern 332 prevents a weak light leakage occurring at the second boundary 'B' of the organic insulation layer 242, which is disposed at the second side portion 545b.

Furthermore, a partial exposure is performed at an upper region 'I' of the first boundary 'A', and both partial exposure and slit exposure are performed at a lower region "II", so that the inclination angle of the first boundary 'A' becomes smaller than the inclination angle of the second boundary 'B'. Therefore, an abnormal arrangement is relieved to reduce a light leakage.

In the present embodiment, an array substrate having a top ITO structure, in which the pixel electrodes comprising indium tin oxide (ITO) is formed on the organic insulation layer, is employed in order to explain the present embodiment. However, the present embodiment may be applied to a bottom ITO structure, in which the pixel electrodes is formed under the organic insulation layer.

Furthermore, in the present embodiment, the reflective layer is formed on the pixel electrode. However, the pixel electrode may be formed on the reflective layer.

According to the present invention, a light blocking pattern is formed in a boundary of the transmissive region and the reflective region to prevent a light leakage occurring at the boundary.

Further, an inclination angle of a first inclined portion that is disposed between the reflective region and the transmissive region in that sequence along the rubbing direction is smaller than an inclination angle of a second inclined portion that is disposed between the transmissive region and the reflective region in that sequence along the rubbing direction with respect to the substrate. Therefore, a pretilt angle of liquid crystal molecules of the first inclined portion is larger than a pretilt angle of liquid crystal molecules of the second inclined portion to reduce a light leakage occurring at the first inclined portion.

Having described the exemplary embodiments of the present invention and its advantages, it is noted that various changes, substitutions and alterations can be made herein without departing from the spirit and scope of the invention as defined by appended claims.

What is claimed is:

1. A method of forming an array substrate, the method comprising:
   forming a first thin film on a transparent substrate;
   patterning the first thin film to form a gate line, a gate electrode protruded from the gate line and a light blocking pattern;
   forming a gate insulation layer and a semiconductor layer over the transparent substrate having the light blocking pattern;
   forming a second thin film on the semiconductor layer;
   patterning the second thin film to form a source line, a source electrode protruded from the source line and a drain electrode that is spaced apart from the source electrode, the gate, source and drain electrodes forming a switching device;
   coating an organic insulation layer on the transparent substrate having the switching device formed thereon;
   removing a portion of the organic insulation layer to form a contact hole through which the drain electrode is exposed, and a transmissive window such that a side portion of the transmissive window overlaps with the light blocking pattern;
   forming a pixel electrode that is electrically connected to the drain electrode via the contact hole over the organic insulation layer; and
   forming a reflective layer over the organic insulation layer to form a reflective window,
   wherein the light blocking pattern overlaps a boundary between the transmissive window and the reflective window, and overlaps an edge of the side portion of the transmissive window furthest from the boundary.

2. The method of claim 1, wherein the light blocking pattern is substantially parallel with the source line.

3. A method of forming an array substrate, the method comprising:
   forming a first thin film on a transparent substrate;
   patterning the first thin film to form a gate line, a gate electrode protruded from the gate line and light
   forming a gate insulation layer and a semiconductor layer over the transparent substrate having the light blocking pattern;
   forming a second thin film on the semiconductor layer;
   patterning the second thin film to form a source line, a source electrode protruded from the source line and a drain electrode that is spaced apart from the source electrode, the gate, source and drain electrodes forming a switching device;
   coating an organic insulation layer on the transparent substrate having the switching device formed thereon;
   removing a portion of the organic insulation layer to form a contact hole through which the drain electrode is exposed, and a transmissive window such that a side portion of the transmissive window overlaps with the light blocking pattern;
   forming a pixel electrode that is electrically connected to the drain electrode via the contact hole over the organic insulation layer; and
   forming a reflective layer over the organic insulation layer to form a reflective window
   wherein
   the light blocking pattern is protruded, such that the light blocking pattern is substantially parallel with the source line, and
   the portion of the organic insulation layer is removed to have a first boundary between the reflective window and the transmissive window disposed in that sequence along a rubbing direction, and a second boundary between the transmissive window and the reflective window in that sequence along the rubbing direction, the first boundary being disposed over the light blocking pattern and a length of the side portion of the transmissive window being shorter than the light blocking pattern, so that the side portion is screened by the light blocking pattern.

4. The method of claim 3, wherein the second boundary is disposed over the light blocking pattern.

5. The method of claim 4, wherein the organic insulation layer is removed by:
   exposing firstly the organic insulation layer to form the contact hole; and
   exposing secondly the organic insulation layer to form the transmissive window.

6. The method of claim 5, wherein the transmissive window is formed by:
   exposing partially an upper portion of the first boundary;
   slit exposing a lower portion of the first boundary; and
   exposing partially the lower portion of the first boundary.

7. The method of claim 1, wherein the light blocking pattern corresponds to a floating line extended substantially in parallel with the source line, the floating line being spaced apart from the gate line.

8. A method of forming an array substrate, the method comprising:
   forming a first thin film on a transparent substrate;
   patterning the first thin film to form a gate line, a gate electrode protruded from the gate line and a light blocking pattern;
   forming a gate insulation layer and a semiconductor layer over the transparent substrate having the light blocking pattern;
   forming a second thin film on the semiconductor layer;
   patterning the second thin film to form a source line, a source electrode protruded from the source line and a drain electrode that is spaced apart from the source electrode, the gate, source and drain electrodes forming a switching device;
   coating an organic insulation layer on the transparent substrate having the switching device formed thereon;
   removing a portion of the organic insulation layer to form a contact hole through which the drain electrode is exposed, and a transmissive window such that a side portion of the transmissive window overlaps with the light blocking pattern;
   forming a pixel electrode that is electrically connected to the drain electrode via the contact hole over the organic insulation layer; and
   forming a reflective layer over the organic insulation layer to form a reflective window,
   wherein
   the light blocking pattern corresponds to a floating line extended substantially in parallel with the source line, the floating line being spaced apart from the gate line, and
   the portion of the organic insulation layer is removed to have a first boundary between the reflective window and the transmissive window disposed in that sequence along a rubbing direction, and a second boundary between the transmissive window and the reflective window in that sequence along the rubbing direction, the first boundary being disposed over the floating line and a length of the side portion of the transmissive window being shorter than the floating line, so that the side portion is screened by the floating line.

9. The method of claim 8, wherein the second boundary is disposed over the floating line.

10. The method of claim 9, wherein the light blocking pattern includes first and second floating lines disposed symmetrically with respect to the source line.

11. The method of claim 10, wherein the portion of the organic insulation layer is removed to have the first boundary between the reflective window and the transmissive window disposed in that sequence along the rubbing direction, and the second boundary between the transmissive window and the reflective window in that sequence along the rubbing direction, the first and second boundaries being disposed over the first and second floating lines, respectively and the length of the side portion of the transmissive window being shorter than the first and second floating lines.

* * * * *